(12) United States Patent
Grob et al.

(10) Patent No.: US 6,894,994 B1
(45) Date of Patent: May 17, 2005

(54) HIGH DATA RATE WIRELESS PACKET DATA COMMUNICATIONS SYSTEM

(75) Inventors: Matthew S. Grob, La Jolla, CA (US); Paul E. Bender, San Diego, CA (US); Peter J. Black, San Diego, CA (US); Roberto Padovani, San Diego, CA (US); Noam A. Ziv, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 09/575,073

(22) Filed: May 19, 2000

Related U.S. Application Data

(63) Continuation-in-part of application No. 08/963,386, filed on Nov. 3, 1997.
(60) Provisional application No. 60/134,976, filed on May 20, 1999.

(51) Int. Cl.[7] ............................................. H04B 7/216
(52) U.S. Cl. ...................................................... 370/335
(58) Field of Search ................................ 370/469, 352, 370/229, 389, 401, 465, 238, 328–335, 431–435, 466, 467, 252; 375/260, 377, 354, 346, 219–222, 240.03; 455/427, 428, 436, 524, 403, 12.1, 422, 442, 512, 430, 574; 709/217, 229, 260; 342/457

(56) References Cited

U.S. PATENT DOCUMENTS

| | | | |
|---|---|---|---|
| 4,901,307 A | | 2/1990 | Gilhousen et al. ............. 370/18 |
| 5,103,459 A | | 4/1992 | Gilhousen et al. ............. 375/1 |
| 6,091,737 A | * | 7/2000 | Hong et al. .................. 370/431 |
| 6,137,839 A | * | 10/2000 | Mannering et al. ......... 375/260 |
| 6,236,365 B1 | * | 5/2001 | LeBlanc et al. ............. 342/457 |
| 6,266,339 B1 | * | 7/2001 | Donahue et al. ............ 370/432 |

* cited by examiner

Primary Examiner—Chi Pham
Assistant Examiner—Prenell Jones
(74) Attorney, Agent, or Firm—Philip Wadsworth; Sandra L. Godsey; Thomas R. Rouse

(57) ABSTRACT

A wireless packet data communications system that includes a number of modem pool transceivers (MPTs), one or more modem pool controllers (MPCs), and one or more servers. Each MPT receives and processes data packets to generate a modulated signal (e.g., a CDMA spread spectrum signal) suitable for transmission over a terrestrial communications link. Each MPC provides call related processing for one or more MPTs. The servers couple to the MPTs and MPCs via an Internet Protocol (IP) back-bone and provide management of the communications system. The IP back-bone further interconnects the MPTs with one or more data networks and includes a number of routers that route data packets between the data networks and the MPTs. Each MPT can couple to two or more routers for redundancy. Each MPT is operated as an element in an IP network and is associated with an IP address that identifies the MPT. One to three MPTs can be deployed at each cell site to provide wireless data service coverage for up to three sectors at the cell site. The MPCs can either be centralized and coupled to the MPTs via the IP back-bone or distributed about the communications system.

33 Claims, 31 Drawing Sheets

HIGH DATA RATE WIRELESS PACKET DATA COMMUNICATIONS SYSTEM

CROSS REFERENCE TO RELATED APPLICATIONS

This application is a continuation-in-part of U.S. patent application Ser. No. 08/963,386, entitled "METHOD AND APPARATUS FOR HIGH RATE PACKET DATA TRANSMISSION," filed Nov. 3, 1997, now U.S. Pat. No. 6,574,211, issued Jun. 3, 2003 to Padovani et al., which is incorporated herein by reference in its entirety for all purposes.

This application further claims the benefit of provisional U.S. Application Ser. No. 60/134,976, entitled "HIGH DATA RATE (HDR) SYSTEM," filed May 20, 1999, which is also incorporated herein by reference in its entirety for all purposes.

BACKGROUND OF THE INVENTION

I. Field of the Invention

The present invention relates to data communication. More particularly, the present invention relates to a novel and improved high data rate, wireless packet data communications system.

II. Description of the Related Art

The explosive growth of computer networks, such as the Internet, has spawned demands for high data rate infrastructures that can support the enormous amount of data traffic generated by these networks. Approximately concurrent with the growth of the Internet is the deployment and acceptance of wireless communications systems capable of supporting a variety of applications. However, earlier generations of wireless communications systems are generally designed for voice communication and are not efficient at transmitting data traffic generated by the Internet.

An example of such earlier generation wireless communications systems is a code division multiple access (CDMA) system disclosed in U.S. Pat. No. 4,901,307, issued Feb. 13, 1990 to Gilhousen et al., entitled "SPREAD SPECTRUM MULTIPLE ACCESS COMMUNICATION SYSTEM USING SATELLITE OR TERRESTRIAL REPEATERS," and U.S. Pat. No. 5,103,459, issued Apr. 7, 1992 to Gilhousen et al., entitled "SYSTEM AND METHOD FOR GENERATING WAVEFORMS IN A CDMA CELLULAR TELEPHONE SYSTEM," both assigned to the assignee of the present invention and incorporated herein by reference. These CDMA systems are typically designed to conform to the "TIA/EIA/IS-95 Mobile Station-Base Station Compatibility Standard for Dual-Mode Wideband Spread Spectrum Cellular System," hereinafter referred to as the IS-95 standard.

An IS-95 compliant CDMA system is capable of supporting voice and data services over the forward and reverse communications links. Typically, each voice call or each data transmission is assigned a dedicated channel having a variable but limited data rate. In accordance with the IS-95 standard, traffic or voice data is partitioned into frames that are 20 msec in duration with data rates as high as 14.4 kbps. The frames are then transmitted over the assigned channel.

Although the IS-95 CDMA system is well suited for voice communication, it is inefficient for data communication, which is typically characterized by long periods of silence punctuated by large bursts of traffic. A newer generation wireless communications system designed to efficiently transmit data is disclosed in the aforementioned U.S. patent application Ser. No. 08/963,386, now U.S. Pat. No. 6,574,211, issued Jun. 3, 2003 to Padovani et al. This system allows a large portion of the available resource to be used for data transmission to a particular user at any particular moment, thereby greatly increasing the peak data rate.

Given the ever-growing demand for wireless data communication, a high data rate, wireless packet data communications system capable of supporting data traffics, such as those related to the Internet, is highly desirable.

SUMMARY OF THE INVENTION

The present invention is a novel and improved high speed, wireless packet data communications system (also referred to as an HDR system) capable of providing wireless Internet services and other packet data services. The HDR system is based on a distributed architecture and includes elements that can be easily deployed and upgraded.

An embodiment of the invention provides a wireless packet data communications system that includes a number of Modem Pool Transceivers (MPTs), one or more Modem Pool Controllers (MPCs), and one or more servers. Each MPT receives and processes data packets to generate a modulated signal (e.g., a CDMA spread spectrum signal) suitable for transmission over a terrestrial communications link. Each MPC provides call related processing for one or more MPTs. The servers couple to the MPTs and MPCs via an Internet Protocol (IP) back-bone and provide management of the communications system. The IP back-bone further interconnects the MPTs with one or more data networks and includes a number of routers that route data packets between the data networks and the MPTs. Each MPT can couple to two or more routers for redundancy.

Each MPT is operated as an element in an IP network and is associated with an IP address that identifies the MPT. To provide a high peak data rate, each MPT can be operated to transmit to one access terminal at any given moment. One to three MPTs can be deployed at each cell site to provide wireless data service coverage for up to three sectors at the cell site. The MPTs are deployable in similar manner as base station transceivers in an existing CDMA system (e.g., IS-95 system). The MPTs can be operated to provide handoff of access terminals to support roaming (i.e., an access terminal can handoff to another MPT having an improved communications path).

The MPCs can either be centralized and coupled to the MPTs via the IP back-bone or distributed about the communications system. Each MPC maintains a protocol stack for each session between an access terminal and the MPTs being controlled by the MPC. The protocol stack identifies the communications parameters for the session and the protocol stack for an inactive (e.g., dormant) access terminal can be stored in a memory.

The servers may include, for example, (1) a RADIUS server that provides authentication, authorization, and accounting functions, (2) an OAM&P server that provides configuration and management functions, (3) a DHCP server that dynamically assigns IP addresses for the access terminals, and (4) an account server that stores user profile information.

The communications system can be operative to provide, for example, wireless Internet services and is capable of achieving a high peak data rate (e.g., at least 2.4 Mbps). The communications system can be deployed as a stand-alone data network, as a data network that is complementary to an existing wireless telephony network (e.g., a CDMA network), or integrated within the CDMA network.

Another embodiment of the invention provides an access terminal for use in a wireless packet data communications system. The access terminal includes an RF module, a modem block, a processor core, and (typically) an interface unit. The RF module receives a modulated signal transmitted over a wireless communications link and conditions the received signal to generate a conditioned signal. The modem block demodulates the conditioned signal to generate data, and the processor core receives and processes the data into packets suitable for transmission to a receiving device. The interface unit provides, for example, an Ethernet or serial interface to the receiving device. The access terminal is operated as an element in an IP network and is associated with an IP address that identifies the access terminal. The access terminal can be assigned a unique identifier and password used to authenticate the access terminal to the communications system. The access terminal can be operated to receive data at a high peak data rate (e.g., at least 2.4 Mbps).

Yet another embodiment of the invention provides a method for providing wireless packet data services in a communications system. In accordance with the method, a session is first initiated between an access terminal and the communications system. A request is then received for a data transmission from the communications system. In response, the requested data is retrieved from a data network and the retrieved data is processed and modulated to generate a modulated signal (e.g., a CDMA spread spectrum signal) suitable for transmission over a terrestrial communications link. The modulated signal is then transmitted to the access terminal. The access terminal is operated as an element in an IP network and is associated with an IP address that identifies the access terminal.

Typically, the access terminal is activated and configured prior to initiating a communications session. The activation and configuration typically include assigning a unique identifier and password to the access terminal to be used for each session. During session initiation, the access terminal can be authenticated via a secure message exchange using, for example, a Challenge Handshake Authentication Protocol (CHAP). The access terminal can also be assigned a static or dynamic IP address to be used for the session.

Other aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

HDR System

Figure 1:
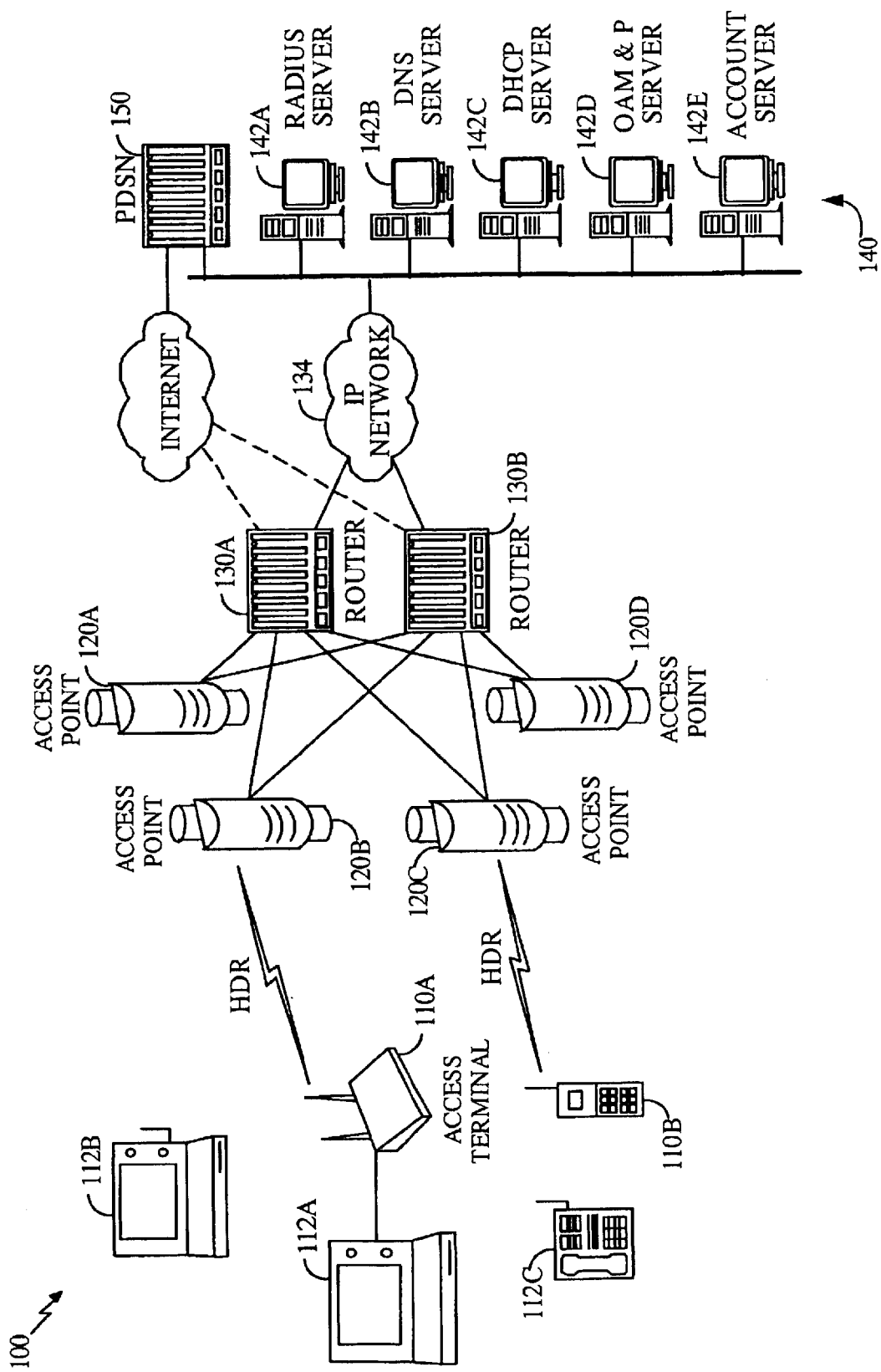
FIG. 1 is a diagram of an embodiment of a wireless packet data communications system of the invention (also referred to as an HDR system)

FIG. 1 is a diagram of an embodiment of a data communications system 100 of the invention, which is also referred to herein as the HDR system. HDR system 100 can be used to provide, for example, wireless Internet services in fixed, portable, and mobile environments. HDR system 100 includes a number of access terminals 110A, 110B (two are shown in FIG. 1) that interface with various devices 112 (e.g., computers, telephones, appliances, and other devices) via wireline and/or wireless communications links.

Each access terminal 110 communicates with one or more access points 120 over a wireless link. Each access point 120 couples to one or more routers 130 via high-speed communications links (e.g., T1/E1, Ethernet, or others). Each router 130 directs traffics among the access points 120 and other network elements and networks coupled to it, such as the Internet. To provide redundancy and improved reliability, each access point 120 may be coupled to two or more routers 130, and each router 130 may couple in parallel with another router. Routers 130 further couple to an Internet Protocol (IP) network 134 that further couples to a Local Area Network (LAN) 140. LAN 140 includes various servers 142 that support the operation of HDR system 100 and is described in further detail below. A Packet Data Serving Node (PDSN) 150 couples to LAN 140 and to the Internet and performs various functions to support packet data service.

Access terminal 110 includes a radio modem and a data interface allowing a user to access a packet data network (e.g., PDSN 150) through a radio network (e.g., the HDR system). Access terminal 110 can be implemented in various physical embodiments such as, for example, a modem, a phone, a module, or some other units. The data interface may allow access terminal 110 to interface with other devices (e.g., a computer, an appliance, Personal Digital Assistance (PDAs), set-top boxes, printers, and so on) via a wireless or wireline link and using various layers, as described below. In the specific example shown in FIG. 1, access terminal 110A interfaces with a computer 112A via a wireline link and with a computer 112B and a telephone 112C via wireless links.

In an embodiment, access points 120 support the air-link with access terminals 110 and provide built-in routing function that can be used to provide IP services. Each access point 120 appears to the rest of the IP network as a modem pool and a Network Access Point (NAP) with an integrated router. As shown in FIG. 1, multiple access points 120 can couple to each router 130 and each access point 120 can couple to two (or more or fewer) routers 130 via high-speed links. Routers 130 form the IP back-bone of HDR system 100.

Each access point 120 supports data transmission to a number of access terminals 110. Each access point 120 also performs some of the functions typically associated with conventional Base Station Transceiver (BTS), Base Station Controller (BSC), and Mobile Switching Center (MSC), as described below. For a particular session, access terminal 110 communicates with one or more access points 120.

The air-link between access terminals 110 and access points 120 can be achieved based on various technologies (e.g., CDMA, TDMA, and so on) and using various designs. In an embodiment, the air-link is implemented based on the HDR design described in the aforementioned U.S. patent application Ser. No. 08/963,386, now U.S. Pat. No. 6,574,211, which is especially suited for packet data transmission. The HDR air-link is designed to be flexible so that multiple architectural options can be supported. For example, sufficient signaling is provided in the HDR air-link such that options ranging from highly integrated architectures to distributed architectures can be supported, as described below.

High-speed communication can be maintained between access points 120, routers 130, IP network 134, and LAN 140. For example, access points 120 can couple to routers 130 via T1/E1, Ethernet, or some other high-speed links. Routers 130 and LAN 140 can each couple to IP network 134 and the Internet via Ethernet or some other link. Other communications links can also be used to interconnect the elements within the HDR system and are within the scope of the invention.

In the embodiment shown in FIG. 1, LAN 140 includes a Remote Authentication Dial-In User Service (RADIUS) server 142A, a Domain Name System (DNS) server 142B, a Dynamic Host Configuration Protocol (DHCP) server 142C, an Operating Administration, Maintenance, and Provisioning (OAM&P) server 142D, and an account server 142E. RADIUS server 142A, DNS server 142B, DHCP server 142C, and OAM&P server 142D can be implemented with off-the-shelf servers that perform the functions normally associated with these servers. A brief description of the functions performed by servers 142A through 142E1 is described below.

RADIUS server 142A performs Authentication, Authorization, And Accounting (AAA) functions. The PDSN communicates with RADIUS server 142A to authenticate and authorize an access terminal 110 and to receive accounting information. RADIUS server 142A also stores profile information and accounting information for users on the HDR system. The accounting information may include, for example, (1) the identity of the network, (2) the identity of the user, the location of the access terminal 110 (e.g., to the resolution of an access point 120 or sector), (3) the start/end time of the communication at that location, (4) the number of octets sent/received at that location, (5) the number of packets sent/received at that location, and others. Records are sent from the access points 120 to RADIUS server 142A periodically.

Various accounting mechanisms can be used for the HDR system since it is not dependent on any particular accounting mechanism. For example, the accounting mechanism used to support telephony networks can be adopted to support the HDR system. The RADIUS accounting can also be used and is described in further detail in Internet Engineering Task Force (IETF's) Request for Comment (RFC) 2139, entitled "RADIUS ACCOUNTING," by C. Rigney, Apr. 1997.

DNS server 142B translates domain names into IP addresses. When a host needs a domain name resolution, DNS server 142B sends out a DNS query to try to resolve the domain name. DNS server 142B may be configured to exchange information with other DNS servers in the IP network.

DHCP server 142C assigns IP addresses to access terminals 110, if and as they are needed. The PDSN communicates with DHCP server 142C and requests IP addresses as necessary.

OAM&P server 142D can be used for configuration and management of the HDR system. Various management mechanisms can be used for the HDR system since it is not dependent on any particular network management mechanism. For example, the systems currently available to support telephony networks can be adopted to support the HDR system.

In an embodiment, a standard Simple Network Management Protocol (SNMP) interface is used as the network management mechanism for the HDR system. The functions performed by OAM&P server 142D via the SNMP interface may include, for example, (1) configuration management, (2) performance management, (3) fault management, and others. The access points 120 can be configured and monitored using off-the-shelf SNMP-based software executed on OAM&P server 142D.

In an embodiment, the access points 120 and other elements (e.g., routers 130, servers 142, and so on) in the HDR system are each provided with a SNMP Management Information Base (MIB) that supports the framework for SNMP information gathering and storage. The SNMP MIB is designed to fit with off-the-shelf network management systems. Elements fitted with SNMP MIBs are able to communicate statistics and status information to a network manager. The network manager is able to request management information from managed nodes and is able to make changes in the way these nodes handle network traffic. OAM&P server 142D can thus be used to configure and monitor the access points 120 in the HDR system.

Account server 142E is used to store information for users on the HDR system (e.g., confidential information, credit card information).

HDR Architectures

The HDR system may be deployed as an HDR radio network (or simply, an HDR network) that provides services to a particular geographic area. In an embodiment, the HDR network may be implemented with a collection of MPCs and MPTs interconnected by an IP network. This architecture provides a location independent, logical separation of radio network functions. This architecture also translates into flexibility in the implementation of the HDR network since network functions can be placed in different network elements depending on the particular implementation.

In an embodiment, an MPT provides functionality analogous to that of a BTS in an IS-41 network. Each MPT can provide service to one or more MPCs and terminates the radio link in an HDR sector associated with the MPT. The MPT performs physical channel modulation/demodulation and also provides Medium Access Control (MAC) functions such as, for example, forward link scheduling and reverse link closed loop power control. The MPT further generates and transmits control channel messages. The IS-41 standard is incorporated herein by reference.

In an embodiment, an MPC provides functionality analogous to that of a BSC and a Visitor Location Register (VLR) in an IS-41 network. Each MPC can receive service from one or more MPTs. The MPC terminates the Radio Link Protocol (RLP) that contains user traffic, controls the air-link connection for each of the connected users as they move throughout the network, transports access terminal 110 specific messages, and provides MAC functions such as, for example, reverse link outer loop power control synchronization.

The MPC performs many of the functions typically performed by a conventional base station controller for a session such as, for example, session control, connection control, and selection functions. In an embodiment, the MPC further maintains a protocol stack for each session, as described below. In an embodiment, for a particular session between an access terminal 110 and the HDR network, only one MPC has control of the session at any particular moment. An access point 120 that includes this MPC is referred to as an "anchor" access point 120.

Network interfaces are used to securely connect a network element (e.g., an MPC, an MPT, and so on) to the IP network and provide different transport options. The network interfaces can be implemented to provide IP network Interior Gateway Protocols (IGPs) such as, for example, Routing Information Protocol (RIP), Open Shortest Path First (OSPF) protocol, and so on. The network interface can further be implemented to provide IP security protocols such as, for example, IP Security (IPSec).

Figure 2:
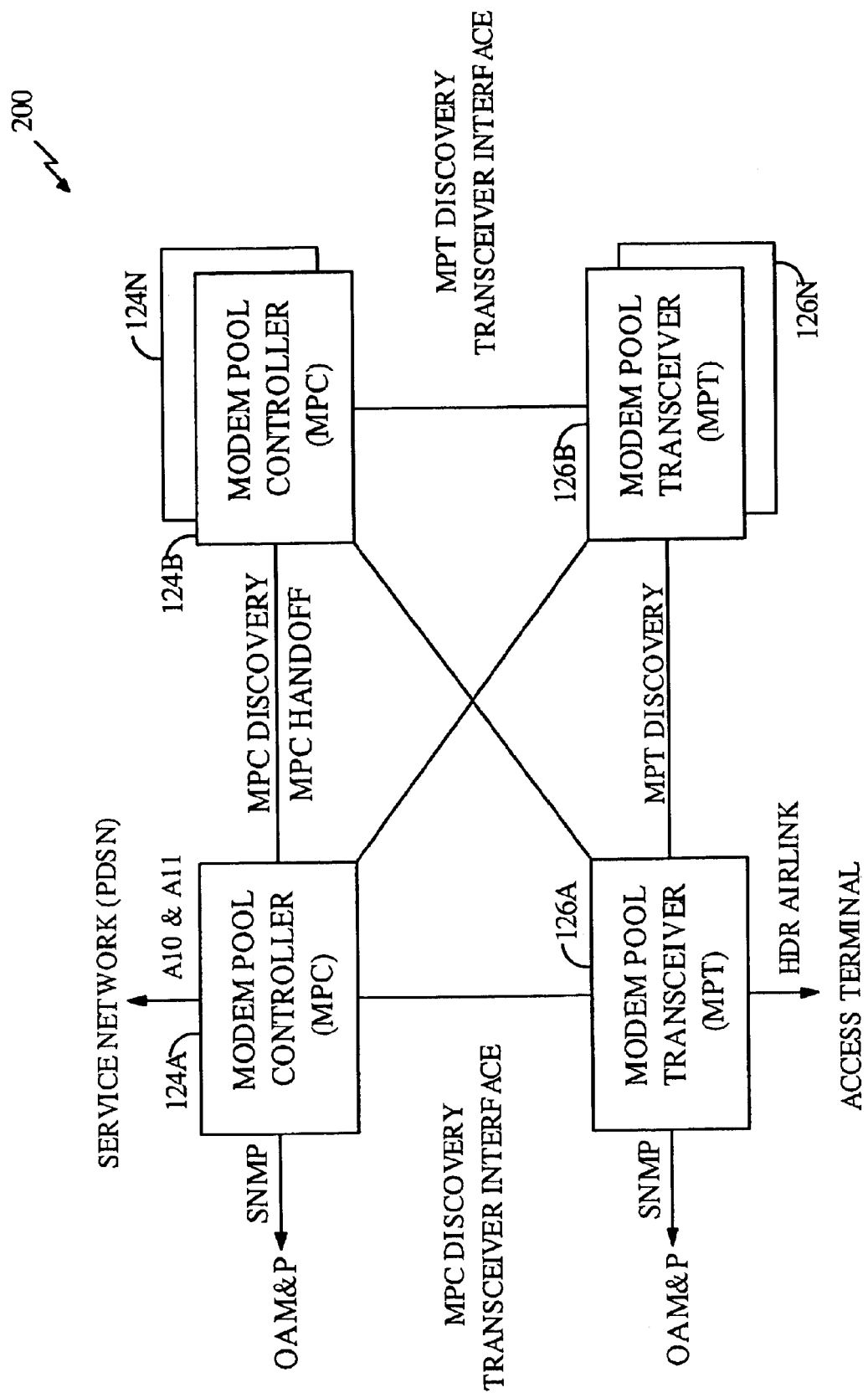
FIG. 2 is a block diagram of an embodiment of an HDR network.

FIG. 2 is a block diagram of an embodiment of an HDR network 200 that includes a number of MPCs 124 that couple to a number of MPTs 126 via network interfaces. In an embodiment, for enhanced flexibility, the interconnection between MPCs 124 and MPTs 126 is a many-to-many relationship accomplished using the network interfaces.

An access terminal 110 establishes communication with a particular MPT 126 via an HDR air-link. MPT 126 is controlled by, and communicates with, an MPC 124 assigned for the communication. MPC 124 further communicates with other elements in the IP network (such as a service network) to provide the requested service.

Various functional interfaces can be provided for the MPCs, some examples of which are described below:

PDSN Interface: Supports the MPC to PDSN traffic and signaling interfaces (A10 and A11) as specified in PN-4545, which is incorporated herein by reference.

MPC Discovery Interface: Allows the MPC to discover configuration and resource availability of another MPC.

MPC Handoff Interface: Allows the MPC to transfer control of an access terminal 110 to another MPC.

MPT Discovery Interface: Allows the MPC to discover configuration and resource availability of an MPT.

MPT Transceiver Interfaces: Allows the MPT to use the transceivers.

Similarly, various functional interfaces can be provided for the MPTs, some examples of which are described below:

MPC Discovery Interface: Allows the MPT to discover configuration and resource availability of an MPC.

MPC Transceiver Interfaces: Allows the MPC to access the transceivers.

MPT Discovery Interface: Allows the MPT to discover configuration and resource availability of another MPT.

Access Terminal Air Interface: Allows the MPT to communicate with the access terminal 110.

The HDR network can be implemented using various architectures. For example, the MPC functionality can be centralized and coupled to the MPTs via the IP network. Alternatively, the MPC functionality can be distributed among the MPTs. Some of these architectures are described below. Other architectures are possible and are within the scope of the invention.

Figure 3A:
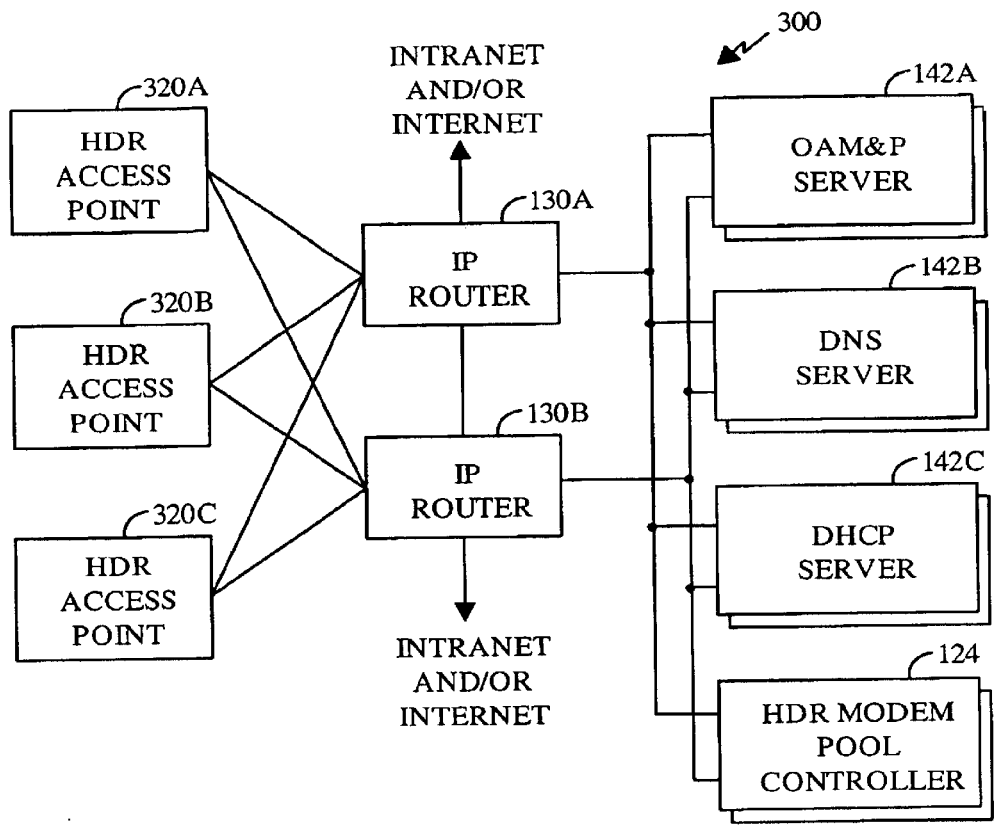
FIGS. 3A and 4A are block diagrams of an HDR network based on a distributed modem pool transceiver (MPT) architecture and a distributed modem pool controller (MPC) architecture, respectively.

FIG. 3A is a block diagram of an embodiment of an HDR network 300 based on a distributed MPT architecture. In the distributed MPT architecture, the MPTs are distributed and the MPCs are centralized. HDR network 300 is formed by interconnecting one or more distributed MPTs (located within access points 320) and one or more centralized MPCs 124. Various types of servers 142 are also provided for system control and management. In an embodiment, two or more routers 130 couple to each access point 320, MPC 124, and server 142 to provide IP routing redundancy within HDR network 300. Also, multiple MPCs 124 and multiple servers 142 of each type may also be employed to provide redundancy.

Figure 3B:
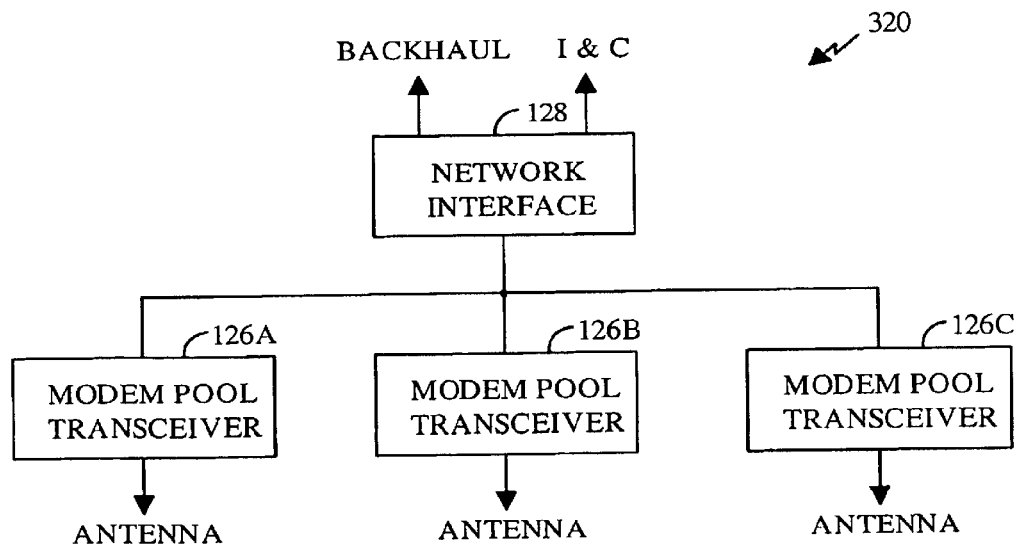
FIGS. 3B and 4B are block diagrams of an embodiment of an access point used in the distributed MPT and distributed MPC architectures, respectively.

FIG. 3B is a block diagram of an embodiment of access point 320 used in the distributed MPT architecture. Access point 320 includes one or more MPTs 126 coupled to a network interface 128. The MPTs are co-located at a particular cell site. For example, for a three sector implementation, three MPTs 126 are co-located within access point 320. Network interface 128 provides connectivity of MPTs 126 to the BACKHAUL.

Figure 4A:
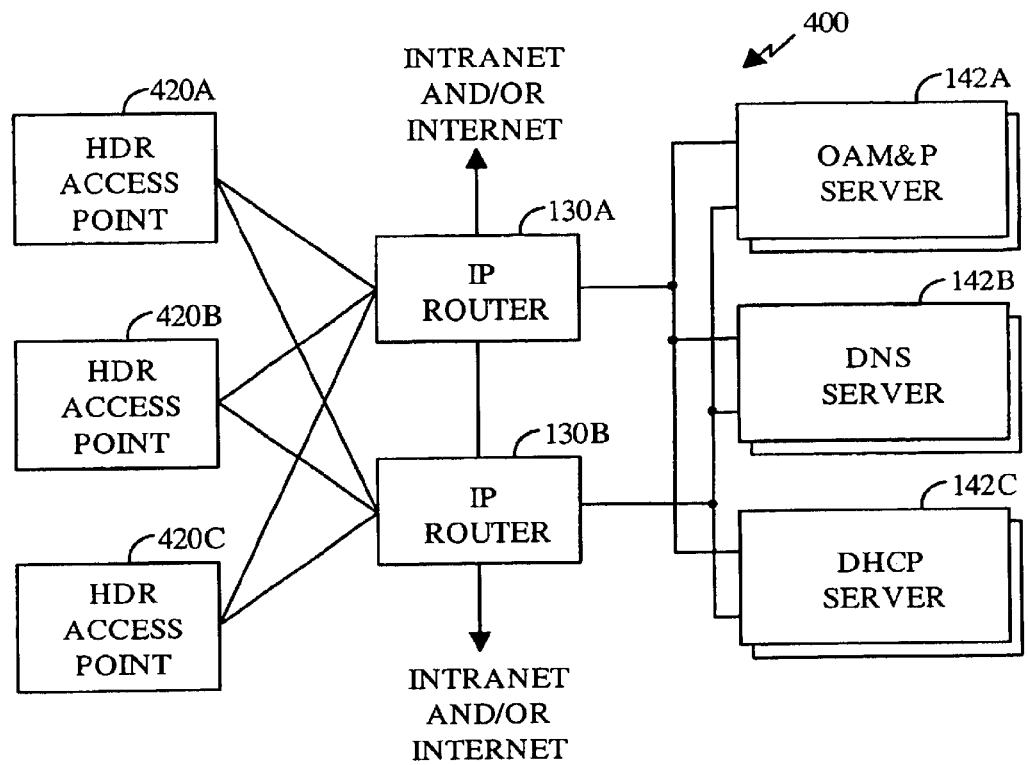

FIG. 4A is a block diagram of an embodiment of an HDR network 400 based on a distributed MPC architecture. In the distributed MPC architecture, the MPTs and MPCs are distributed. HDR network 400 is formed by interconnecting one or more distributed MPCs that are located within access points 420. Various types of servers 142 are also provided for system control and management. In an embodiment, two or more routers 130 couple to each access point 420 and server 142 to provide IP routing redundancy within HDR network 400. Also, multiple servers 142 of each type may be employed to provide redundancy.

Figure 4B:
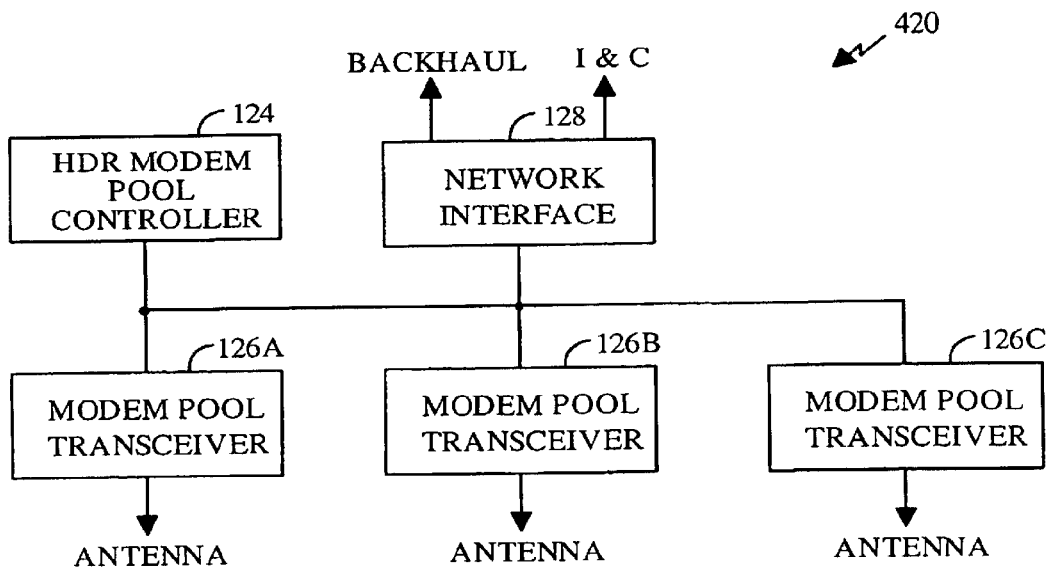

FIG. 4B is a block diagram of an embodiment of access point 420 used in the distributed MPC architecture. Access point 420 includes one or more MPTs 126 coupled to one or more MPCs 124 and to a network interface 128. The embodiment shown in FIG. 4B includes one MPC 124, three MPTs 126, and one network interface 128 and can be used to support three sectors or three carrier frequencies in one sector.

The elements of the HDR network can be implemented in various embodiments depending on the particular HDR architecture employed. For example, one or more MPTs and zero or more MPCs can be integrated into a hardware platform referred to above as an access point 120. Similar to a conventional wireless network in which the BTS function is local at the cell site, the access point 120 can be designed to provide the MPT function at the cell site. However, the controller function in the HDR network may be centralized at one location (for a distributed MPT architecture) similar to a conventional wireless network, or distributed at the cell site (for a distributed MPC architecture).

For each session between the access terminal 110 and the HDR system, the access point 120 that performs the MPC functions for the access terminal 110 is designated as the "anchor" access point 120 for that access terminal 110's session.

The access points 120 in the distributed MPT and distributed MPC architectures can be physically implemented in various manners. For example, the access point 120 can be implemented as a channel card that can be used to upgrade a multi-carrier BTS to implement the HDR system. The access point 120 can also be implemented as a packaged hardware box that can be deployed using the cell site, tower, and antennas of a pre-existing wireless system or using its own cell site, tower, and antennas. Various other implementations can also be contemplated and are within the scope of the invention.

The HDR system is thus based on a distributed (i.e., decentralized) architecture that allows the system to be scaled with demands. For example, additional access points 120 can be installed to provide coverage to a new geographic area or to increase system throughput. Also, the access points 120 can be upgraded or replaced with minimal disruption in service to the rest of the HDR system.

Access Network

The HDR system may be deployed in various manners. For example, the HDR system may be (1) deployed as a stand-alone data network, (2) deployed as a data network complementary to an existing wireless telephony network (e.g., a CDMA network), or (3) integrated into a CDMA system deployment. The stand-alone and complementary HDR system can be implemented with independently packaged access points 120. The integrated system can be implemented, for example, with HDR channel cards used to upgrade a multi-carrier BTS. As used herein, a CDMA system/network that is complementary to the HDR system/network can be any wireless system/network that conforms to any standards (e.g., an IS-95 standard, a CDMA-2000 standard, or some other standards), or is implemented based on other designs.

Figure 5:
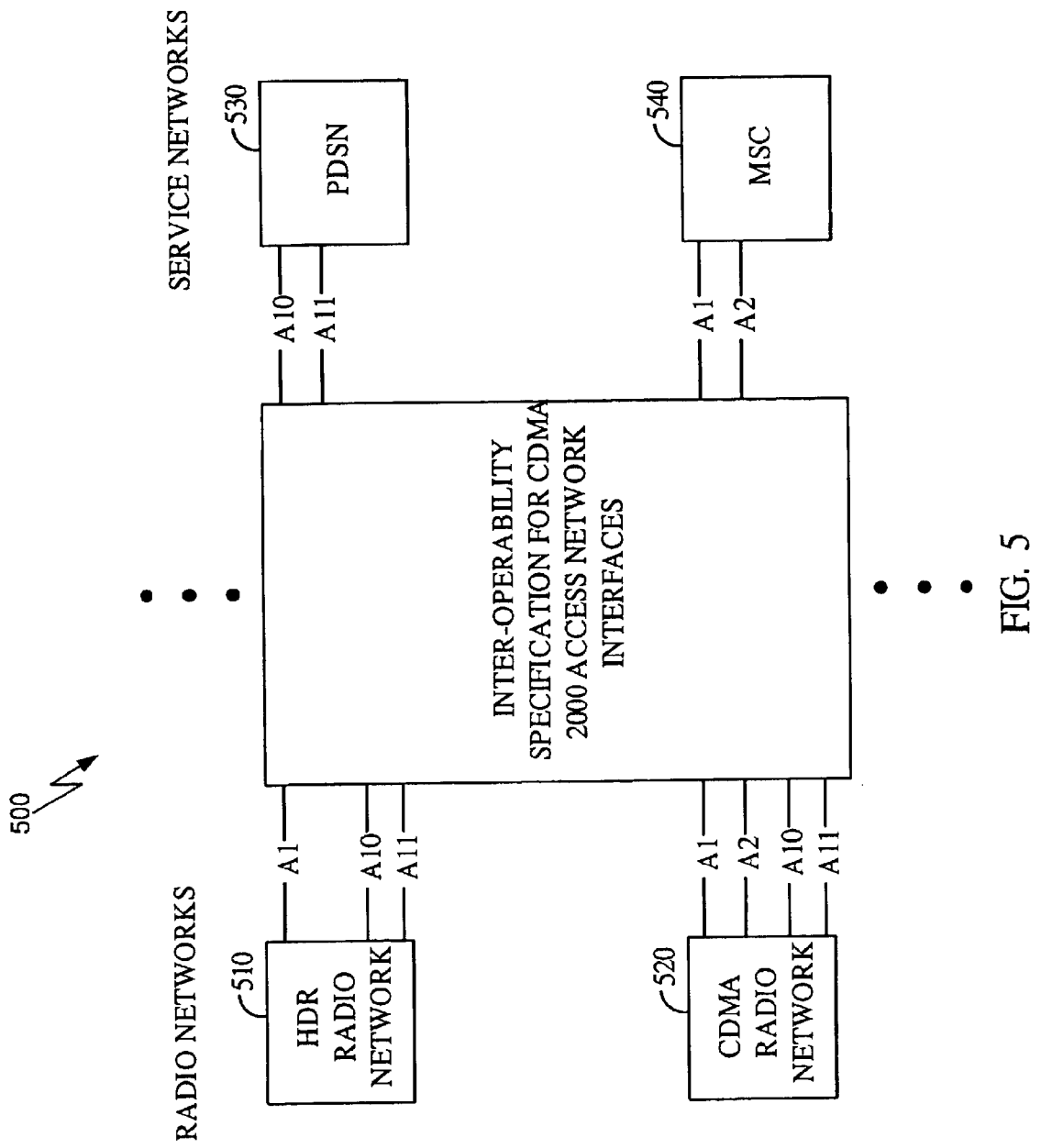
FIG. 5 is a block diagram of an access network that includes one or more radio networks interconnected to one or more service networks.

FIG. 5 is a block diagram of an access network 500 that includes one or more radio networks interconnected to one or more service networks. The radio networks can include an HDR radio network 510, a CDMA radio network 520, some other radio networks, or a combination thereof. The service networks can include a Packet Data Service Node (PDSN) 530, a Mobile Switching Center (MSC) 540, some other service networks, or a combination thereof.

Radio networks 510 and 520 provide the radio access for the access terminals 110 within these networks. PDSN 530 provides packet data service to the access terminals 110 and performs conventional network access point functionality such as, for example, the Point-to-Point Protocol (PPP), the RADIUS protocol, and the mobile IP protocol.

As shown in FIG. 5, each radio network interfaces to a service network using one or more of the interfaces defined in the "Inter-operability Specification for CDMA Access Network Interfaces," which is incorporated herein by reference. For packet data services, the interfaces are the Packet Control Function (PCF) node to PDSN traffic interface (A10) and the PCF to PDSN signaling interface (A11). For IS-41 and Public Switched Telephone Network (PSTN) services, the interfaces are the BSC to MSC signaling interface (A1) and the BSC to MSC Pulse Code Modulation (PCM) traffic interface (A2).

For enhanced compatibility and flexibility, the functionality of HDR radio network 510 is designed to map to the functionality of a radio network in a CDMA wireless IP network. This allows HDR radio network 510 to be easily integrated with CDMA systems and to connect to the same PDSN 530. Although HDR radio network 510 can conform to the same model as CDMA radio network 520, there are no dependencies between these radio networks. HDR radio network 510 can thus be deployed independently from, in conjunction with, or integrated with CDMA radio network 520.

HDR radio network 510 can also be deployed in conjunction with other wireless radio networks such as, for example, GSM, TDMA, and others.

As noted above, various HDR architectures are provided by the invention including the distributed MPT and distributed MPC architectures described in FIGS. 3A and 4A, respectively. Moreover, the HDR system can be deployed as a stand-alone data network, a data network complementary to an existing CDMA network (e.g., an IS-95 network, a CDMA2000 network, or some other radio networks), or integrated into the CDMA network. The functionality and services provided by the HDR system may also be combined with those of another system such that one access terminal 110 can be used to obtain voice, data, and other services. In an embodiment, the RF characteristics of the HDR system are designed to be similar to those of CDMA systems. This allows the HDR and CDMA systems to share cell sites, towers, antennas, and other system elements.

Various deployments of the HDR system using various architectures are thus possible. Some of these deployments are described below.

Figure 6A:
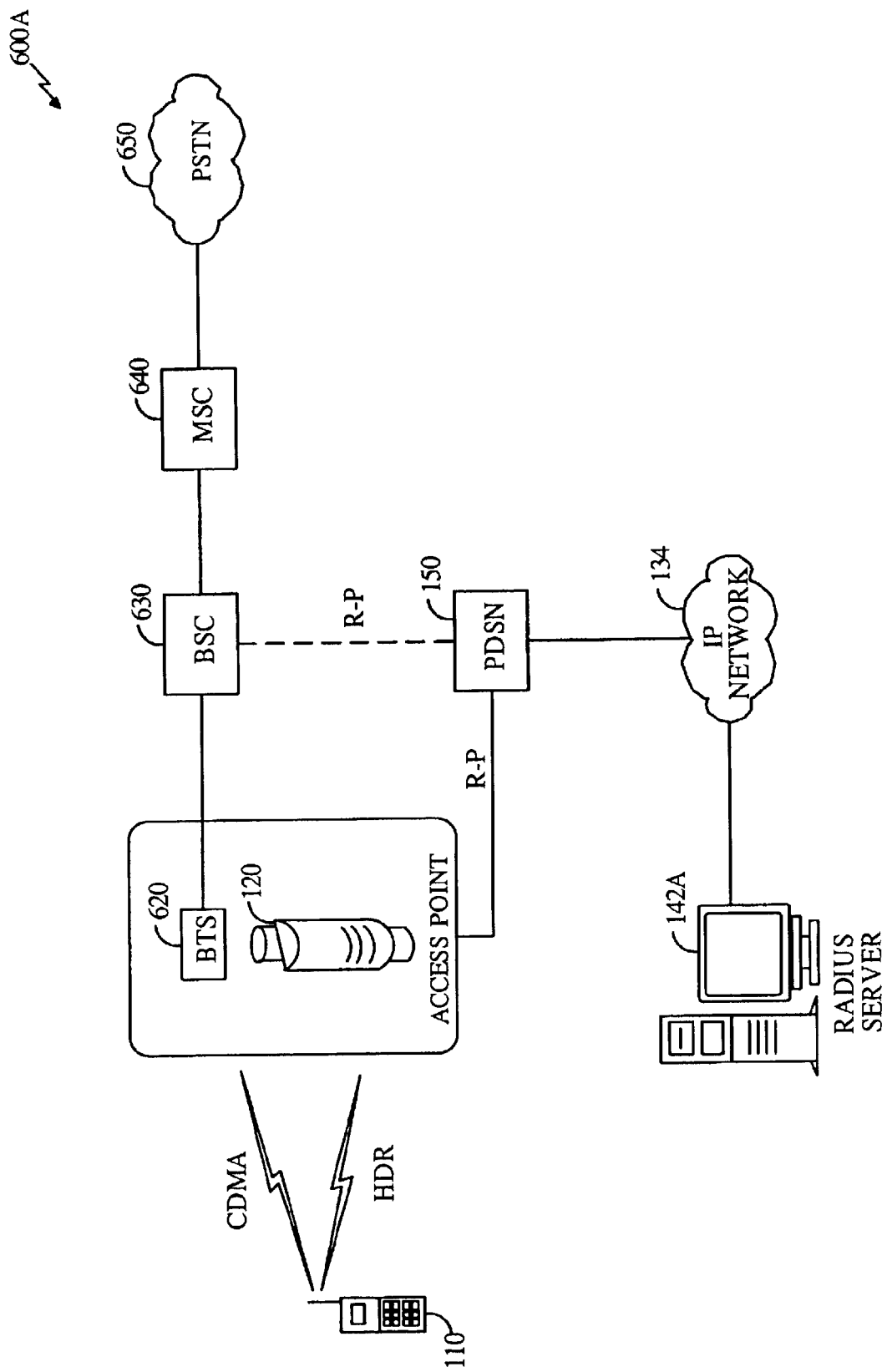
FIGS. 6A through 6C are diagrams of various deployment of the HDR system in conjunction with a wireless telephony system.

FIG. 6A is a diagram of an embodiment of a communications system 600A created by deploying an HDR system complementary to an existing wireless telephony system (e.g., a CDMA, TDMA, or GSM system). As described above in FIG. 1, the HDR system includes a number of access points 120 (only one is shown in FIG. 6A for simplicity) that couples to PDSN 150 via an "R-P" interface, which is part of the A-interface. PDSN 150 couples to IP network 134 that further couples to servers 142 (only RADIUS server 142A is shown for simplicity).

The CDMA system includes a number of BTS 620 coupled to a number of BSC 630 (only one of each is shown in FIG. 6A for simplicity). BSC 630 further couples to a switching MSC 640 that further couples to a PSTN 650. The operation of the CDMA system is known in the art and not described herein. BSC 630 can further couple to PDSN 150 via R-P.

As shown in FIG. 6A, access points 120 in the HDR system can be packaged in separate units that can be co-located with existing BTSs 620. This deployment offers flexibility in allowing the service providers to deploy HDR equipment from manufacturers that may not be the same as their phone network equipment providers. This is possible since the HDR equipment need not be the same as the BTS hardware.

A dual mode access terminal 110 can be used to receive service from either the CDMA system or the HDR system, or both (and possibly concurrently). Access terminal 110 is described in further detail below.

Figure 6B:
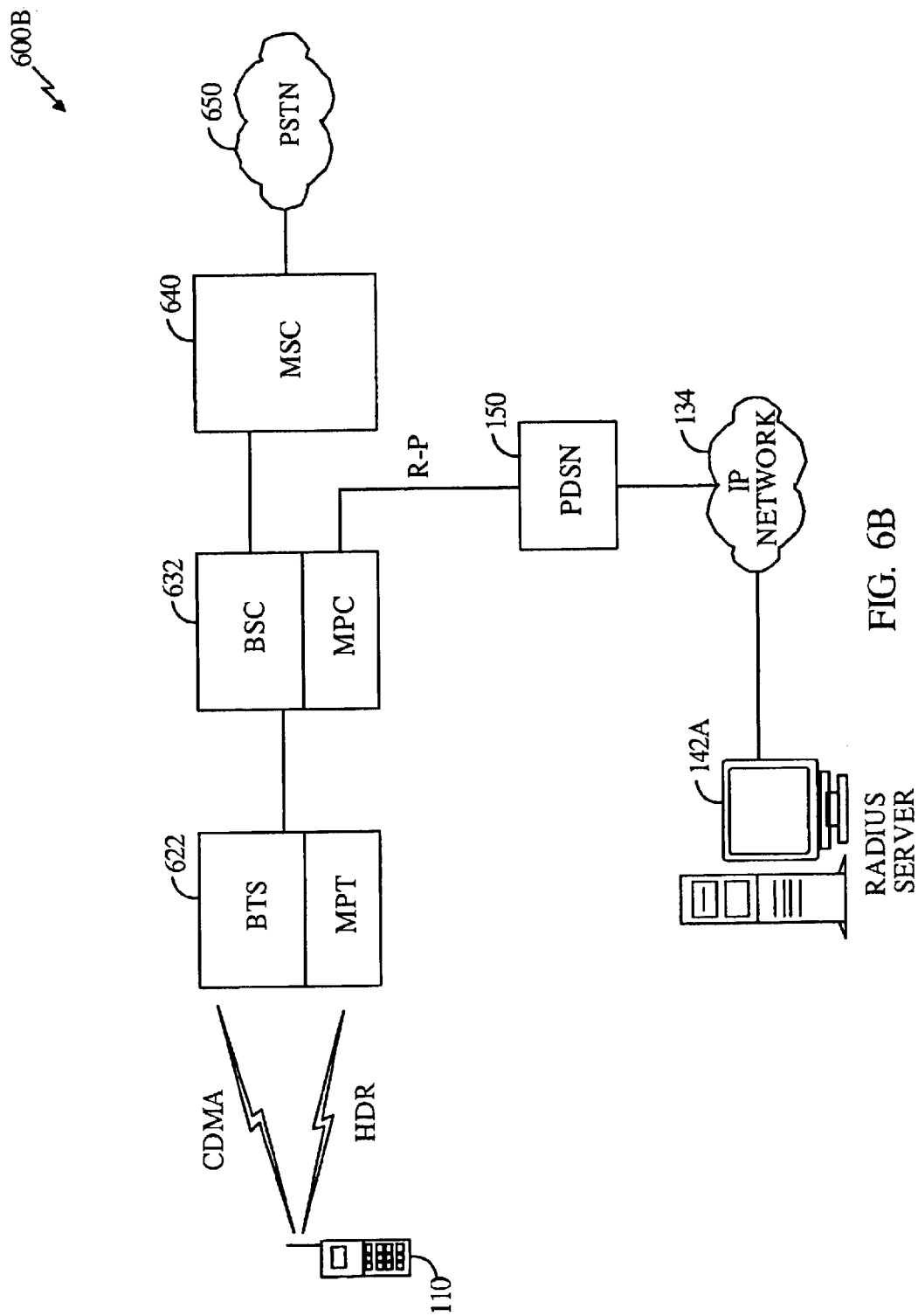

FIG. 6B is a diagram of an embodiment of a communications system 600B created by integrating an HDR system within a CDMA system and using the distributed MPT architecture. System 600B includes a number of integrated transceivers 622 that provide the functions of the BTS in the CDMA system and the MPT in the HDR system. Integrated transceivers 622 are further coupled to integrated controllers 632 that provide the functions of the BSC in the CDMA system and the MPC in the HDR system. Integrated controller 632 couples to MSC 640 to support CDMA functionality and to PDSN 150 to support HDR functionality. A distributed MPT access point 120 can be implemented, for example, as an HDR channel card that can be upgraded into a BTS (e.g., a multi-carrier BTS) to form integrated transceivers 622.

Figure 6C:
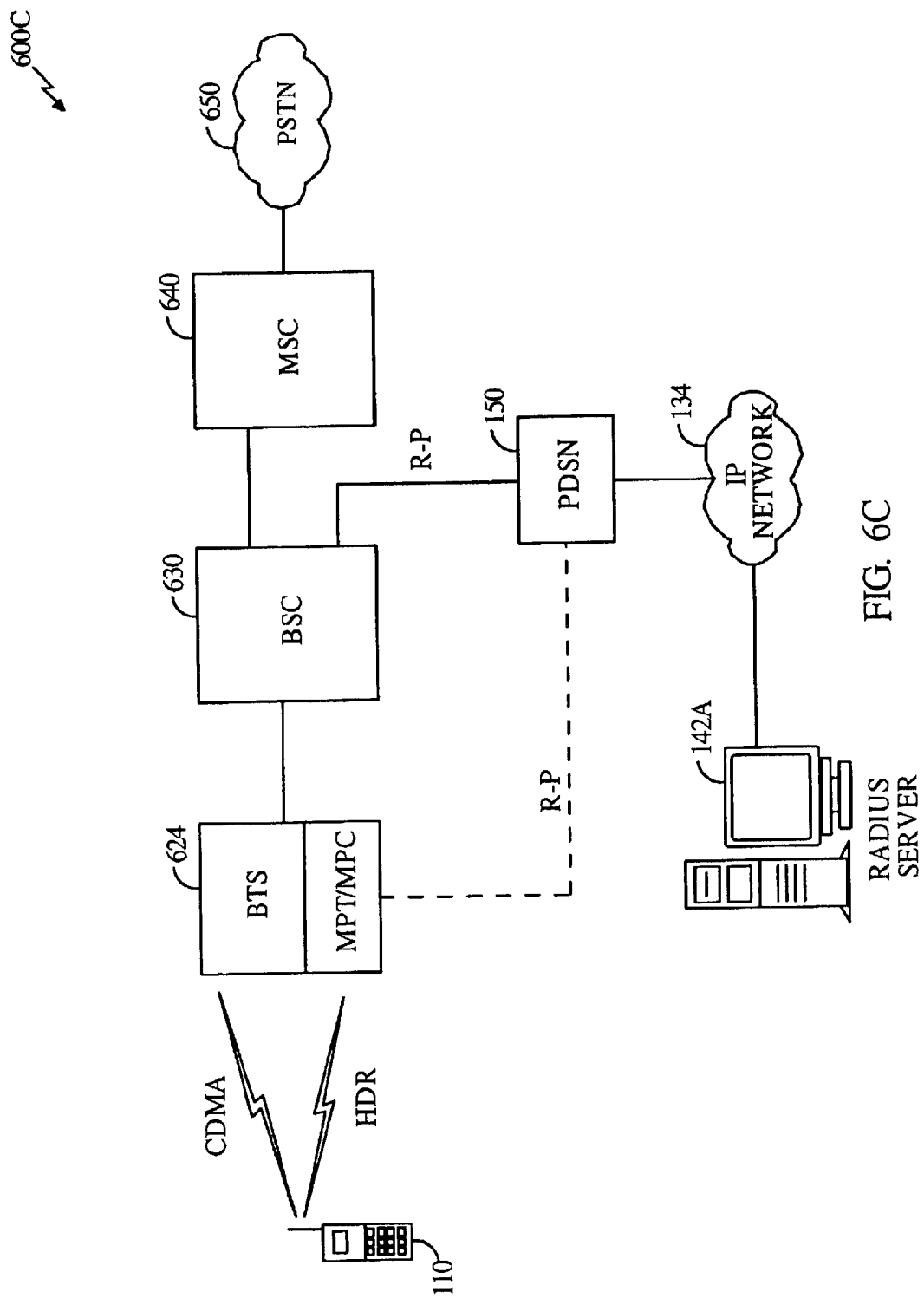

FIG. 6C is a diagram of an embodiment of a communications system 600C created by integrating an HDR system within a CDMA system and using the distributed MPC architecture. System 600C includes a number of integrated transceivers 624 that provide the functionality of the BTS in the CDMA system and the MPT in the HDR system. Integrated transceiver 624 couples to BSC 630 that further couples to MSC 640 to support CDMA functionality. Integrated transceiver 624 also couples to PDSN 150 to support HDR functionality. The MPC functionality is distributed and resides in the access points 120 (located within integrated transceiver 624). A distributed MPC access point 120 can be implemented, for example, as an HDR channel card that can be upgraded into a BTS to form integrated transceiver 624.

For the dual system deployments described above, the HDR system can be used to efficiently provide high-speed packet data services and the CDMA system can be used to efficiently provide voice and other delay sensitive services. By using an efficient air-link for data services (e.g., the Internet) and a suitable air-link for voice services, the two systems can maximize the use of precious air-link resources and thereby provide multiple high quality and cost-effective services to consumers.

For dual deployment systems such as those shown in FIGS. 6A through 6C, seamless operation of multi-mode devices (e.g., access terminal 110) is possible. Voice service can be provided by the CDMA system. Data service can be provided by the HDR system, or by the CDMA system at lower data rates in areas where HDR has not yet been deployed. Applications that require simultaneous voice and data can also be accommodated, and handoffs between CDMA and HDR are also possible.

IP Backbone

Figure 7:
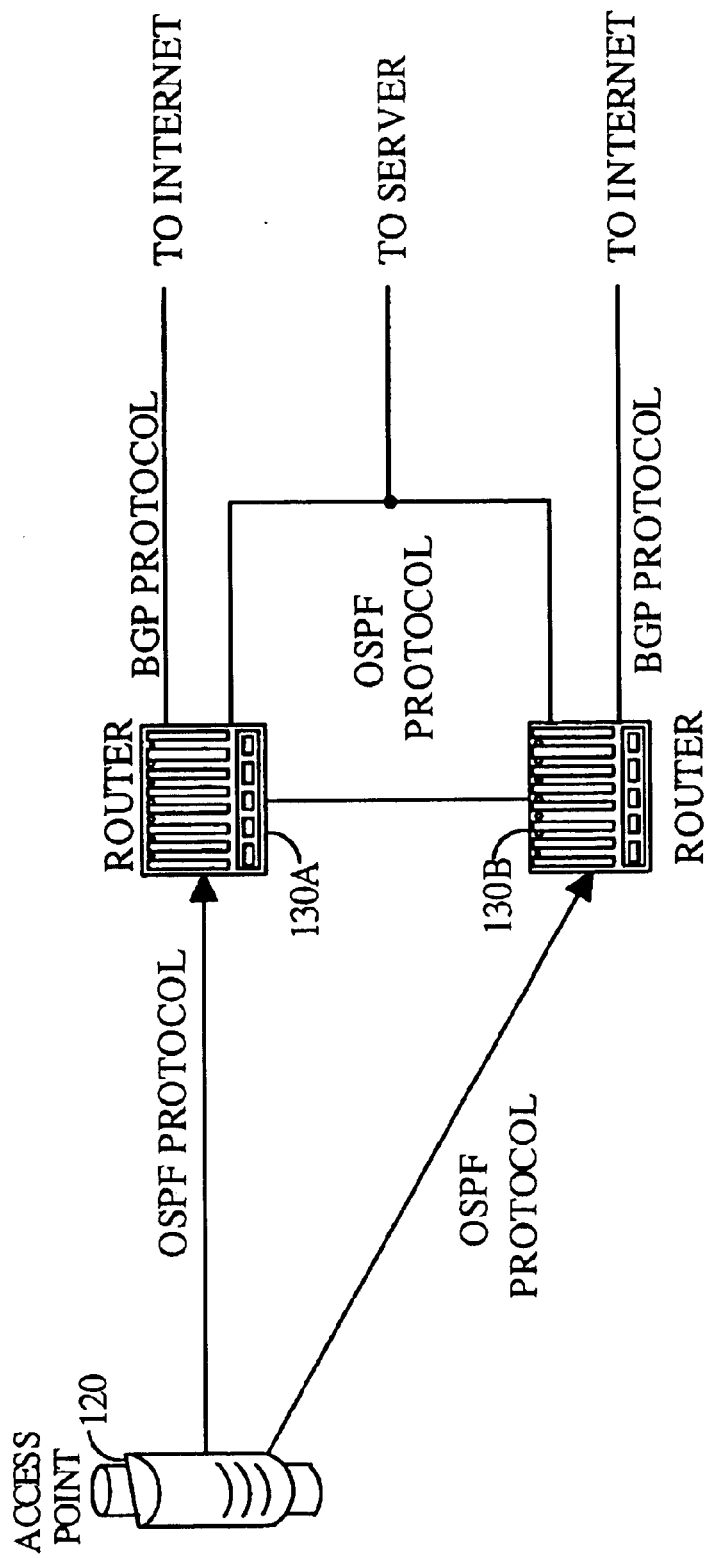
FIG. 7 is a diagram that illustrates the communication between the access point and the routers in the IP backbone of the HDR system.

FIG. 7 is a diagram that illustrates the communication between an access point 120 and the routers in the IP backbone of the HDR system. As noted above, to provide enhanced performance and improved reliability, each access point 120 can couple to two (or possibly more) routers in the IP backbone. Various routing protocols and interfaces can be used for communication between the access points 120 and the routers. For example, the Open Shortest Path First (OSPF), the Border Gateway Protocol (BGP), or some other routing protocol can be use for communication. The interface between the access points 120 and routers can be, for example, IP over T1/E1, IP over Ethernet, or some other interface. Each router further couples to other servers and networks via any type of interface supported by that particular router model.

The HDR system is highly available to the users due to its decentralized architecture. From each access point 120, there are multiple paths available in the IP backbone so the user's information can traverse alternate paths if needed. Furthermore, the use of OSPF from the access points 120 over the backhauls allows alternate links to accommodate the backhaul traffic if one or more backhaul links are out of service. The OSPF protocol is also capable of balancing the traffic load on multiple backhaul links between the access points 120 and routers (since they are considered equivalent routes) and is further capable of supporting automatic failover. The access points 120 and routers also provide high availability options through the use of hardware redundancy and data mirroring.

Tunneling and Virtual Private Networks

The HDR system can be designed to support a Virtual Private Network (VPN) via "user initiated" and "compulsory" tunneling mechanisms that run over IP. VPN uses secure tunneling protocols (i.e., strong encryption and authentication) to provide a secure private channel across a public network such as the Internet. Secure VPN services can be provided, for example, by use of the IPSec protocol.

User initiated tunnels are transparent to the HDR system. Thus, the RADIUS server and access points 120 behave the same way whether the user connects directly to the HDR system or initiates a tunnel to another network.

Compulsory tunnels are not initiated by the user but are directed by the HDR system. For example, compulsory tunnels may be used to cause the user's traffic to be directed to an Internet Service Provider (e.g., a corporate network) that is different than the service provider for the HDR system.

Figure 8:
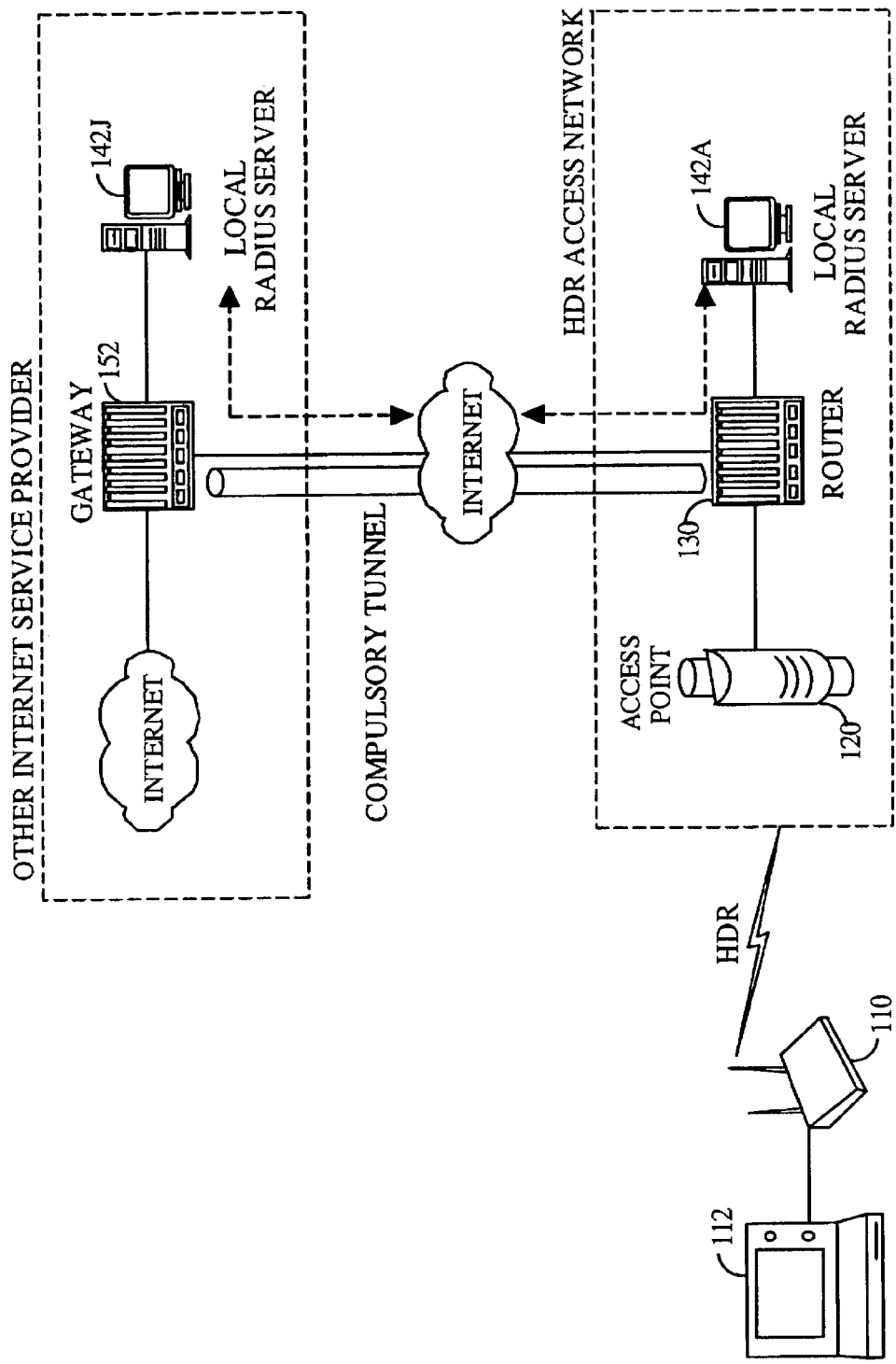
FIG. 8 is a diagram that illustrates a communication via a compulsory tunnel in the HDR system.

FIG. 8 is a diagram that illustrates a communication via a compulsory tunnel in the HDR system. Initially, the user on client computer 112 establishes a connection to access point 120 in the normal manner. Access point 120 communicates with RADIUS server 142A via a router 130. Local RADIUS server 142A then contacts remote RADIUS server 142J for authentication and authorization purposes. After authentication and authorization, remote RADIUS server 142J sends back the IP address of a gateway 152 for the tunnel to be used for communication. Subsequently, packets sent by the user are tunneled to gateway 152, which removes the outer IP header in the packets and sends the information to the intended destination. At the end of the session, access point 120 may tear down the tunnel.

Layers

In an embodiment, the HDR system uses the Internet Protocol (IP) as a transport and supports network applications and protocols that are compatible with IP. The HDR system may also be designed to support additional or different protocols for transport, and this is within the scope of the invention.

In addition, the HDR system may be designed to support one or more communications models such as, for example, a "network model" commonly used in IS-95 CDMA standards and literatures and a "relay model". In an embodiment, the access point side of the HDR system is the same for both the network and relay models—only the access terminal 110 is different, as described below.

A session is a shared state maintained between an access terminal 110 and a radio network. The shared state may be associated with information such as, for example, the set of protocols used between the access terminal 110 and radio network, the configuration of these protocols, an estimate of the access terminal 110's current location, and so on. This information is typically stored in a protocol stack maintained for the session.

Figure 9A:
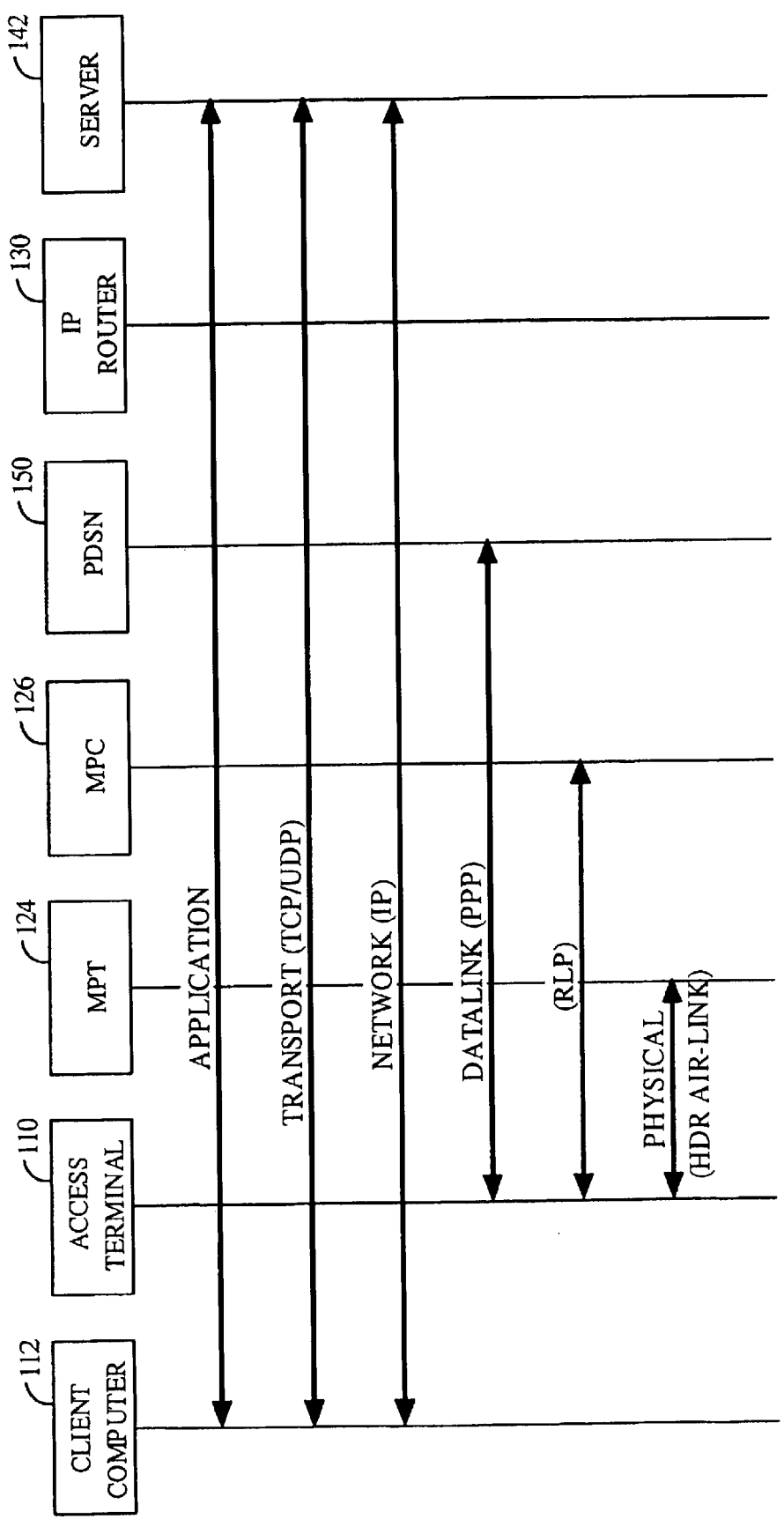
FIGS. 9A and 9B are diagrams of a protocol stack that is established based on a network model and a relay model, respectively.

FIG. 9A is a diagram of a protocol stack that is established, based on the network model, for a particular session in the HDR system. In the network model, client computer 112 communicates with servers 142 via the application, transport (e.g., TCP/UDP), and network (e.g., IP) layers. In the network model, client computer 112 relies on access terminal 110 to provide the PPP stack. The network model is suitable for an access terminal 110 that interfaces to the user's computer via, for example, an Ethernet or Universal Serial Bus (USB) connection. The layers shown in FIG. 9A are described in further detail below.

Figure 9B:
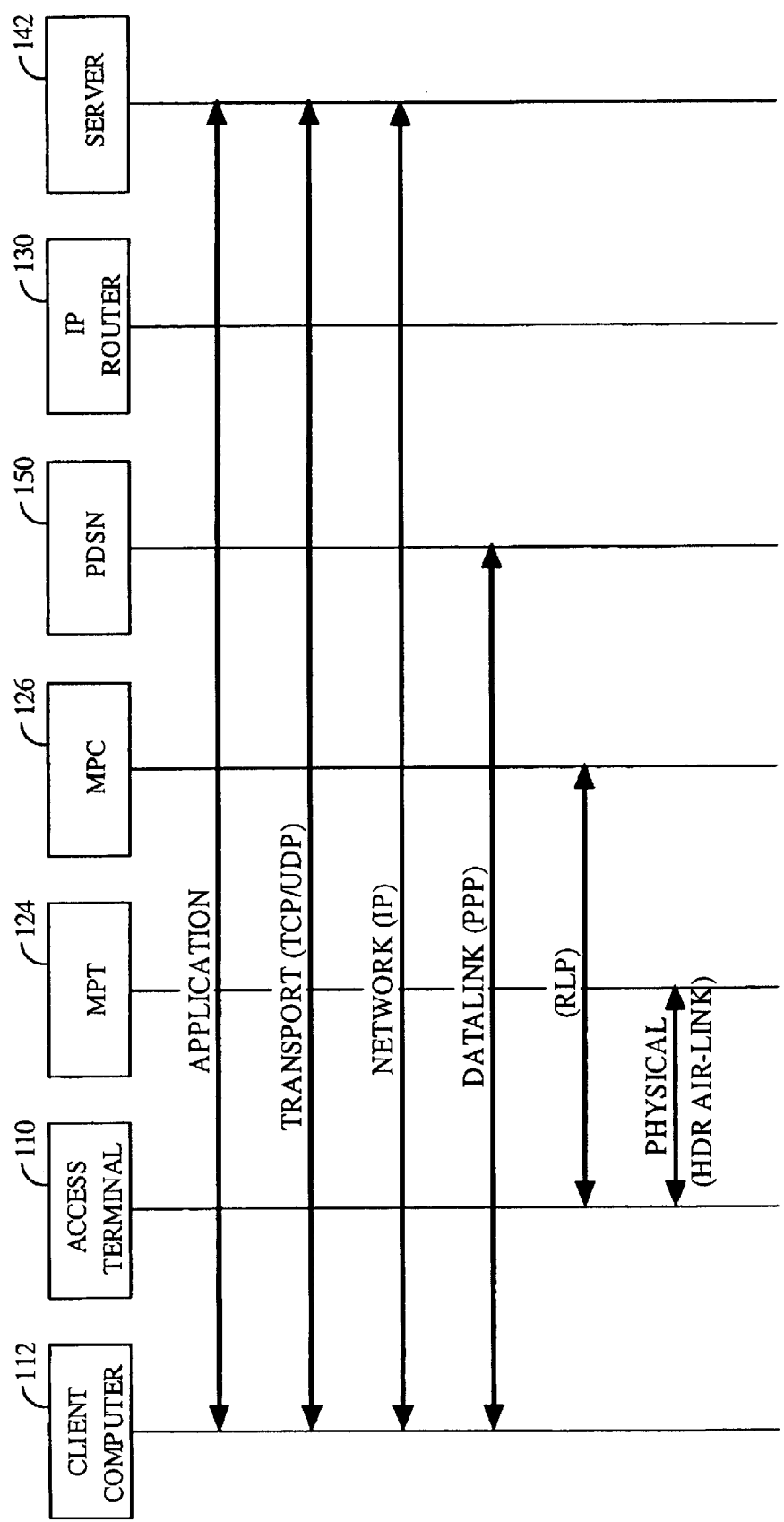

FIG. 9B is a diagram of a protocol stack that is established, based on the relay model, for a particular session in the HDR system. The relay model relies on client computer 112 to provide the IP and PPP stacks. This model is suitable for an access terminal 110 that interfaces to the user's computer via, for example, a serial connection (e.g., RS-232, USB, and others).

In an embodiment, the physical layer between the access terminal 110 and access point 120 is an air-link such as the one described in the aforementioned U.S. patent application Ser. No. 08/963,386, now U.S. Pat. No. 6,574,211, which is also referred to as the HDR physical layer and HDR air-link. The HDR air-link is designed based on IS-95 CDMA technology but is adopted for efficient packet data services (e.g., Internet services). The HDR physical layer provides the modem and framing functions for the wireless HDR air-link. The access and connection set-up process for the HDR system is similar to the access process for the IS-95 CDMA system, which is described in further detail in the aforementioned IS-95 standard documents. Modifications to the HDR physical layer, or other air-links, may also be used and are within the scope of the invention.

In an embodiment, a Radio Link Protocol (RLP) layer is provided as an additional layer on top of the HDR physical layer to provide error detection and error correction for the wireless link. The RLP layer is designed to reduce the air-link frame error rate to a level where higher layer protocols can operate effectively. The RLP layer attempts to achieve a frame error rate in the order of $10^{-6}$. The RLP layer receives data that is to be sent over the air, puts the data in a byte stream for over-the-air transmission, and subsequently puts back the received bytes in the appropriate order after the transmission. The RLP layer keeps track of the byte stream and is able to retransmit missing or erroneous bytes over the air. The RLP layer is unaware of any framing that is done in the layers above it.

In an embodiment, the data link layer employs the Point-to-Point Protocol (PPP) to carry IP. The PPP and the layers above it are not aware that they are utilizing a wireless physical layer and behave in the same manner as for a wire-line data session. During the PPP link set-up, connection parameters and Van Jacobson TCP/IP header compression are negotiated and an IP address is allocated. PPP also employs a Cycle Redundancy Check (CRC) to identify errors in transmission.

In an embodiment, the network layer utilizes the well-known Internet Protocol (IP) as a transport mechanism. With this connectionless protocol, each IP packet travels independently until it arrives at the host (e.g., the user's computer or the server being accessed). IP packets may arrive out of sequence and are put back together at the host by the higher layers. To simplify the design of the HDR system and provide enhanced compatibility and connectivity with existing networks, the access points 120 and other elements in the back-bone of the HDR system communicate via IP. The access points 120 and back-bone elements (e.g., routers, servers, and so on) are assigned static IP addresses. The access terminals 110 may use static IP addresses or may be assigned dynamic IP addresses at the start of the sessions.

In an embodiment, the transport layer utilizes the Transmission Control Protocol (TCP), the User Datagram Protocol (UDP), some other protocol, or a combination thereof. UDP is a transport protocol that does not provide reliability mechanisms and is typically used when reliability is not required. A UDP datagram consists of a single message that either requests a piece of information or replies to a request. TCP is a reliable transport that keeps track of communication between two hosts (e.g., the user's computer and the server being accessed). Each TCP connection is uniquely identified by the combination of the two pairs of IP address and TCP port numbers (two TCP sockets). TCP also provides error detection and error recovery mechanisms.

Applications

For enhanced flexibility, the HDR system is designed to support numerous mainstream applications that are based on, for example, TCP/IP or UDP/IP. These applications include, for example, web browser application, electronic mail application, and others. Generally, communications protocols are established during session initiation. These protocols are then used to support various applications that may be executed by the user on the client. A protocol stack identifies various layers established for a particular session and the particular protocol employed at those layers. The protocol stacks for some example applications are described below for a better understanding.

Figure 10A:
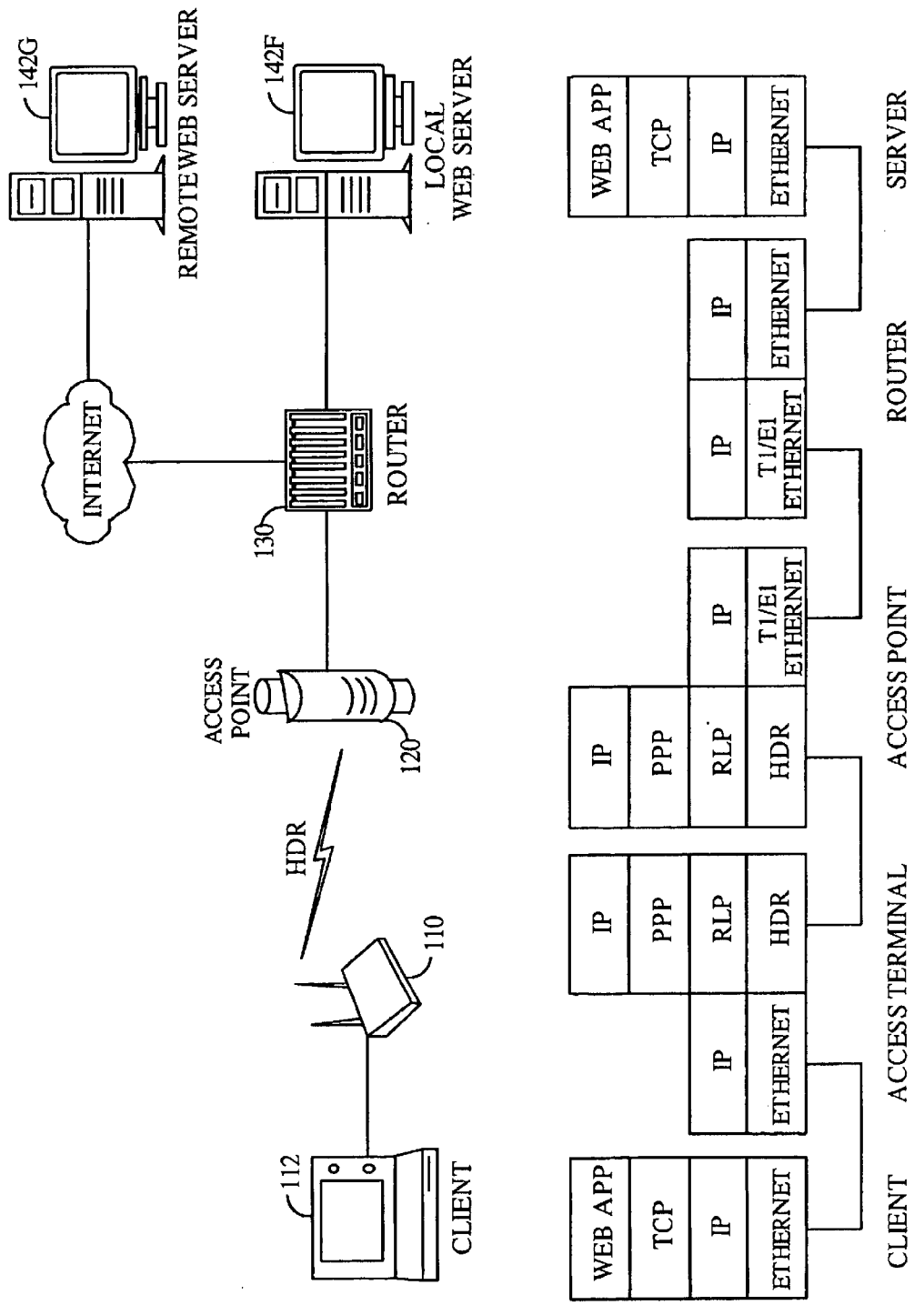
FIGS. 10A and 10B are diagrams of a protocol stack for a web browsing session and an e-mail session, respectively.

FIG. 10A is a diagram of a specific embodiment of a protocol stack for the HDR system during a web browsing session. Initially, the user executes a web browser application on the user's computer (the client) to search, retrieve, and browse documents that are stored on web servers such as a local web server 142F coupled to router 130 and a remote web server 142G coupled to router 130 via the Internet. After a web browsing session has been established, the protocol stack for various elements in the communications path, from client 112 to servers 142, is shown at the bottom of FIG. 10A.

The protocol stack shown in FIG. 10A represents a specific implementation. The client and web servers execute web applications that run over TCP, IP, and Ethernet. The communication from the client to the web servers is achieved via IP. The air-link between the access terminal 110 and access point 120 is achieved using PPP, RLP, and the HDR air-link. Other protocols can also be used to facilitate communication between the hosts and are within the scope of the invention. For example, at the data link layer, Ethernet may be replaced with another protocol (e.g., USB, serial, and so on).

For web browsing application, the information contained in the documents can be transmitted across the Internet using, for example, the HyperText Transport Protocol (HTTP). A variety of end-to-end security protocols can be used to provide a secured web browsing session. For example, Secure Socket Layer (SSL) protocol can be used to provide a secure channel between the two hosts (i.e., the user's computer and the server being accessed). Secure HTTP protocol can also be used to provide security for web documents using the web browser application.

Figure 10B:
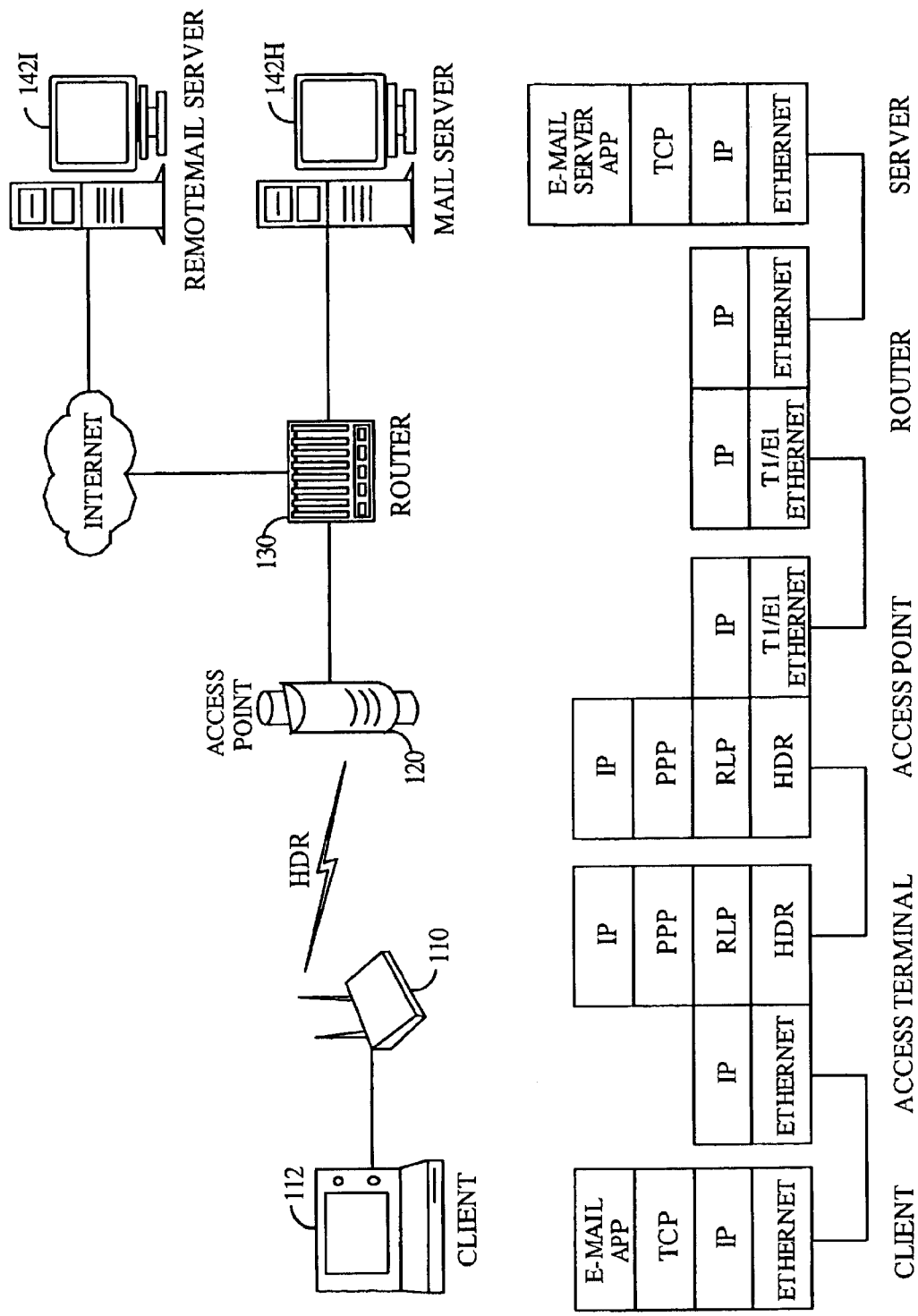

FIG. 10B is a diagram of a specific embodiment of a protocol stack for the HDR system during an e-mail session. Initially, the user executes an e-mail application on the user's computer (the client) to communicate with mail servers such as a local mail server 142H coupled to router 130 and a remote mail server 142H coupled to router 130 via the Internet. After an e-mail session has been established, the protocol stack for various elements in the communications path, from client 112 to servers 142, is shown at the bottom of FIG. 10B.

Similar to FIG. 10A, the protocol stack shown in FIG. 10B represents a specific implementation. The client and mail servers execute e-mail applications that run over TCP, IP, and Ethernet. The communication from the client to the mail servers is achieved via IP, and the air-link between the access terminal 110 and access point 120 is achieved using PPP, RLP, and HDR air-link. Other protocols can also be used and are within the scope of the invention.

E-mail can be supported through use of various protocols such as, for example, the Simple Mail Transfer Protocol (SMTP), the Post Office Protocol version 3 (POP3), the Internet Message Access Protocol (IMAP), and others. The user runs an e-mail application (i.e., user agent) on the client, which communicates with the mail servers (i.e., message transfer agents) periodically to send e-mail messages or to check whether new messages have arrived.

Authentication, Encryption, and Data Reliability

The HDR system supports several mechanisms to provide a secure service. These mechanisms include, for example, (1) authentication and authorization of the users by the RADIUS server at session initiation, (2) authentication and encryption of frames sent over the reverse link from the access terminals 110 to the access points 120, (3) authentication (and possibly encryption) of management messaging information sent over the HDR system backhauls using the IPSec protocol, (4) prevention of malicious user traffics by fire walls installed on each access point 120, and possibly other mechanisms. Security features are provided to protect against theft of service and loss of user identity. User data can be protected, for example, by various mechanisms provided at higher layer protocols.

In an embodiment, strong authentication mechanisms are provided at the air-link layer to prevent and deter theft-of-service attacks. In a specific implementation, the access terminal 110 sends an authentication code with each reverse link packet sent to the access point 120. The access point 120 then authenticates each packet received from the access terminal 110. The authentication codes can be generated using various secure algorithms such as, for example, the SHA-1 hash algorithm or some other algorithm known in the art.

In an embodiment, the HDR system is designed to provide strong encryption mechanisms at the air-link layer that prevent, among other things, the user's identity from being sent over-the-air in the clear. In a specific implementation, the access terminal 110 encrypts each reverse link packet to prevent eavesdroppers from discovering the user's identity. Various encryption algorithms can be used to encrypt packets and to generate the stream cipher used for encryption. For example, the access terminal 110 can use the SOBER stream cipher for encryption.

Figure 11A:
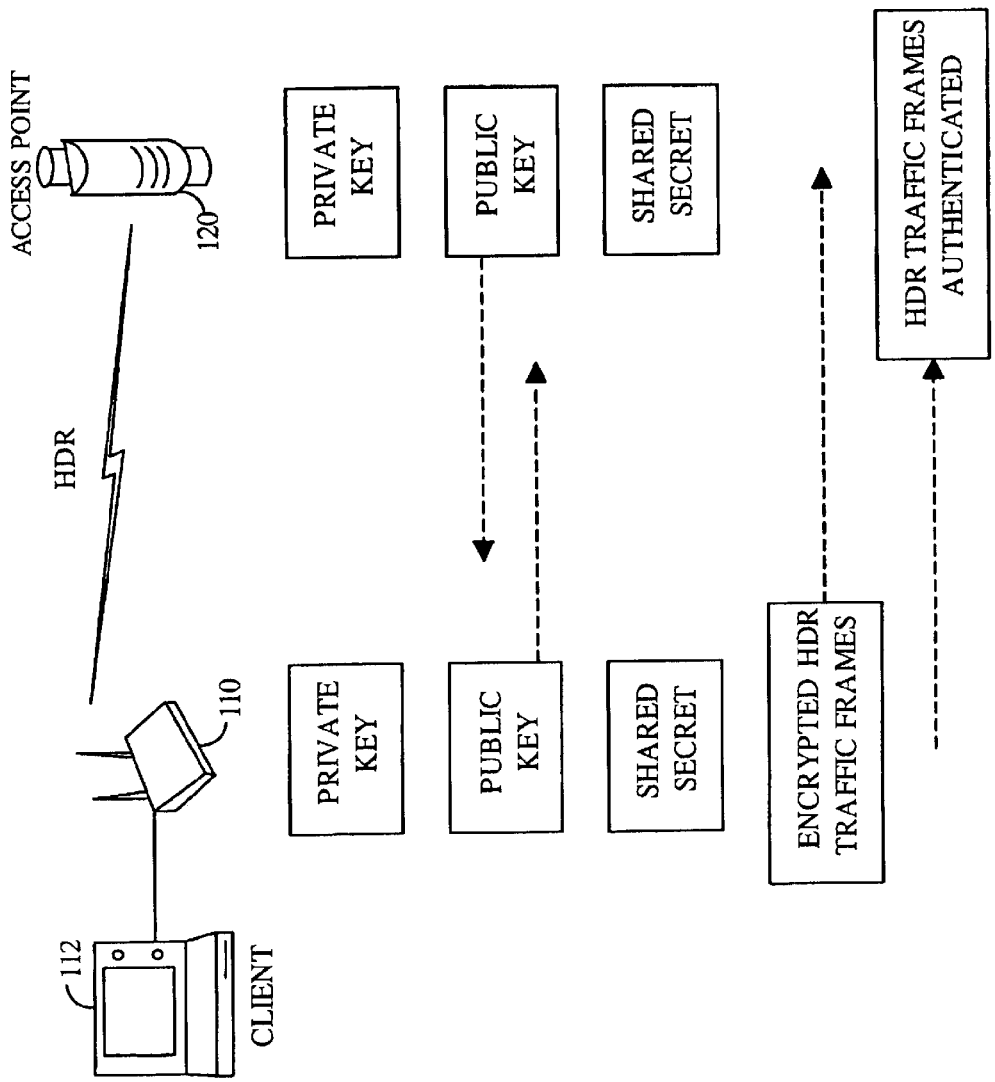
FIG. 11A is a diagram that illustrates communication between various elements of the HDR system to provide a secure air-link.

FIG. 11A is a diagram that illustrates communication between various elements of the HDR system to provide a secure air-link. Security on the air-link can be established and maintained between the access terminal 110 and access point 120 without intervention from other elements in the HDR system. Initially, the access terminal 110 and access point 120 exchange ephemeral keys using, for example, the Diffie-Hellman algorithm. Each side then independently derives a shared secret, based on its own private key and the public received from the other side. The shared secret is then used to derive session authentication keys and encryption keys. In a specific implementation, new keys are regenerated with each new session but the same session authentication keys are used even as the user goes in and out of dormancy (described below) within a particular session. Security algorithms are described in further detail in a book entitled "Applied Cryptography," which is incorporated herein by reference.

End-to-end security at higher layers can be used to provide a secure communication. Generally, the two communicating hosts (i.e., the client and the server being accessed) cooperate to provide end-to-end security of the user data using one or more security protocols. Any security protocol that is compatible with IP can be used. For example, an application layer security protocol such as Secure Socket Layer (SSL) that is supported by many secure web sites and available on many web browsers can be used for secure web transactions. A network layer security protocol such as Point-to-Point Tunneling Protocol (PPTP) of IPSec (for Virtual Private Networks) can also be used. These are some example security protocols that can be used to provide end-to-end security, and others can also be used and are within the scope of the invention.

Figure 11B:
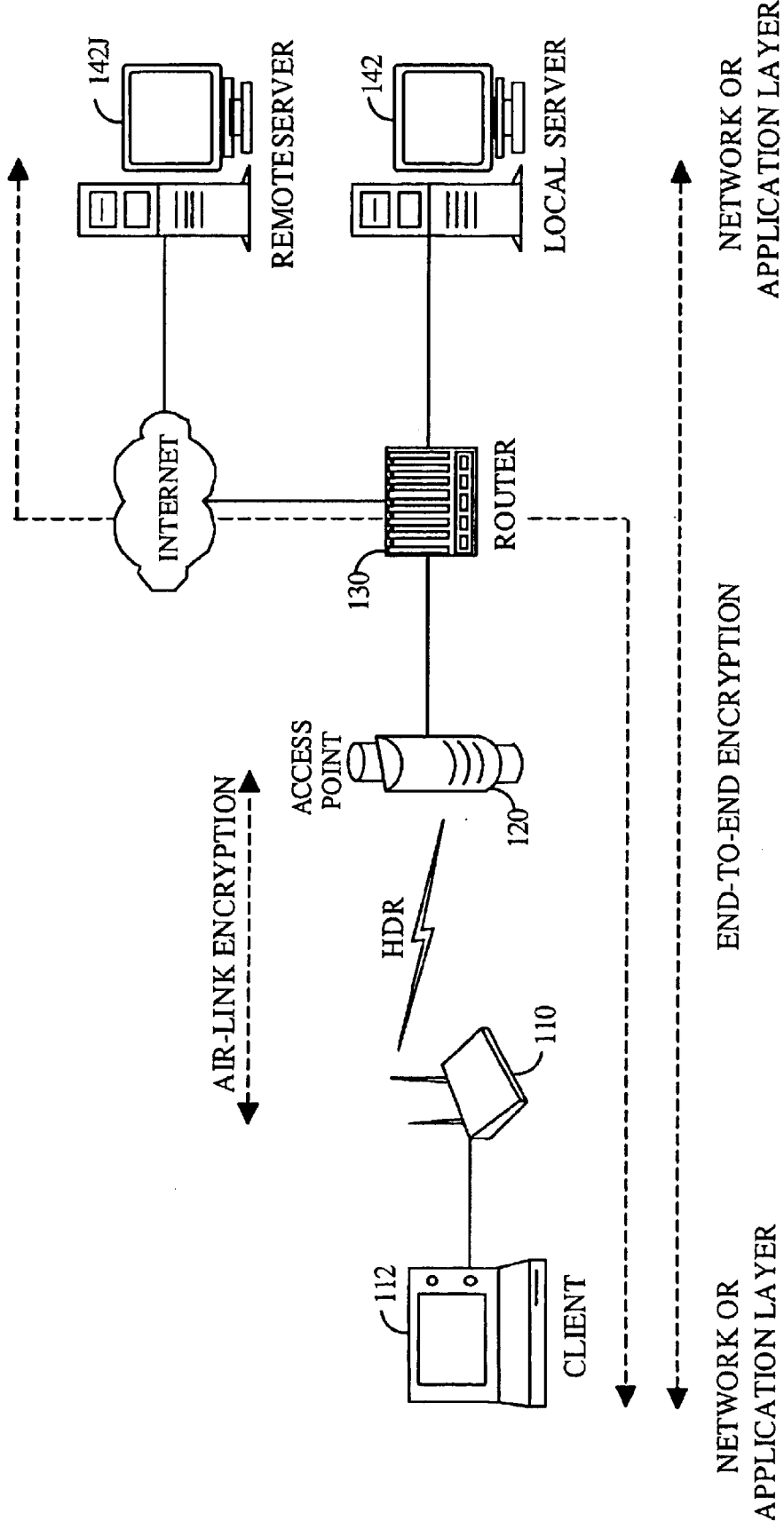
FIG. 11B is a diagram that illustrates various security mechanisms employed in the HDR system to provide secure communication.

FIG. 11B is a diagram that illustrates various security mechanisms employed in the HDR system to provide secure communication. Security in the air-link is provided by the authentication and encryption mechanism described above. End-to-end security from client 112 to servers 142 can be provided at the network or application layer, or both, using the mechanisms developed and available for these layers.

To provide a reliable data delivery service, error detection and/or error correction mechanisms can be provided at one or more layers. In an embodiment, the HDR system utilizes three levels of error detection and correction at the RLP, PPP, and TCP layers. In general, data applications are not as sensitive to delays as voice applications. This allows the HDR system to provide various mechanisms for error detection and data retransmission. The combination of these mechanisms at the RLP, PPP, and TCP layers can provide a low packet error rate comparable to those of conventional wire-line data systems.

The HDR system utilizes the RLP layer to reduce the effective air-link frame error rate to a level (e.g., in the order of $10^{-6}$) where higher layer protocols can operate efficiently. This is described above with reference to FIGS. 9A and 9B. The RLP mechanism uses a Negative Acknowledged (NAK)-based scheme to signal frames received in error, thereby reducing the amount of signaling. In an embodiment, the HDR system employs an enhanced RLP mechanism that sequences octets instead of frames. This enhanced RLP mechanism results in a more efficient retransmission mechanism and can effectively handle complex issues relating to segmentation and re-assembly when a retransmitted frame cannot fit into the payload available at the time of retransmission.

The PPP layer utilizes a Cyclic Redundancy Check (CRC) to provide additional error detection capability. The TCP also offers a significant amount of error detection and correction at the two end points and is a reliable transport mechanism.

Operating States

The access terminals 110 and access points 120 allow the HDR system of the invention to provide various wireless packet data services such as, for example, web browsing, electronics mail, and many others. Various phases and aspects of the operation of the HDR system are described below.

Figure 12:
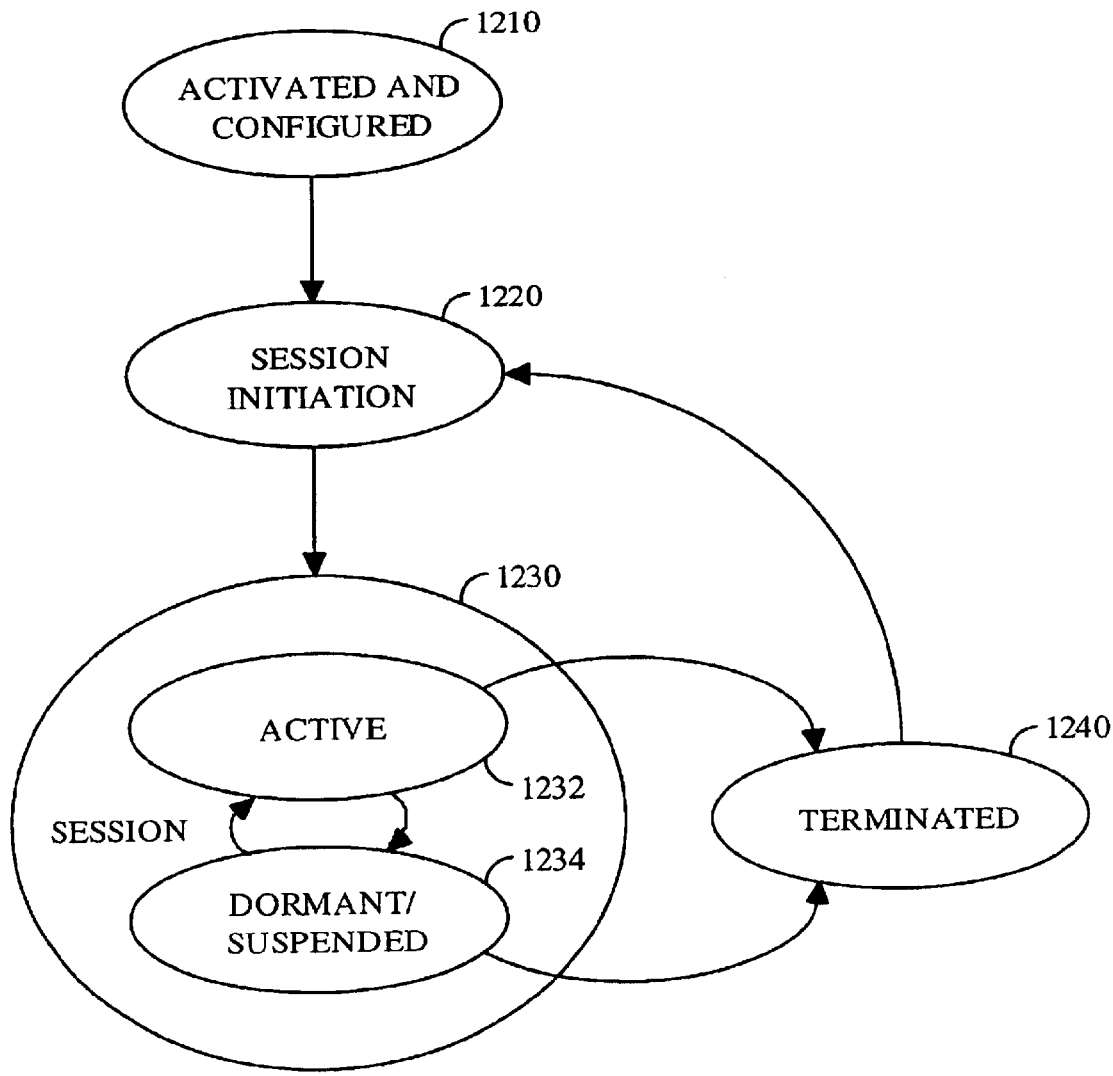
FIG. 12 is a state diagram of some of the operating states of an access terminal in the HDR system.

FIG. 12 is a simplified state diagram of an embodiment of some of the operating states of an access terminal 110 in the HDR system. The state diagram includes an activated and configured state 1210, a session initiation state 1220, a session state 1230, and a terminated state 1240. In an embodiment, session state 1230 includes an active substate 1232 and a dormant/suspended substate 1234. Other states and substates can also be implemented and are within the scope of the invention.

Prior to use, the access terminal 110 is activated and configured. The activation allows the HDR system to register the access terminal 110 and determine the type of service to be provided to the access terminal 110. A configured access terminal 110 is provided with the user identification, password, and other pertinent information to be used for subsequent communication. An activated and configured access terminal 110 enters state 1210 and can subsequently establish a session with the HDR system.

To establish a session, the access terminal 110 enters session initiation state 1220. In this state, the access terminal 110 is authenticated and the necessary communication parameters are established. After the session has been established, the access terminal 110 enters session state 1230 and can receive and transmit data. During the session, the access terminal 110 can move between active substate 1232 and dormant/suspended substate 1234 depending the status of the access terminal 110. Upon termination of the session, the access terminal 110 enters terminated state 1240.

Service Activation and Configuration

Prior to use, the access terminals 110 are activated and registered with the HDR system. Service activation may be achieved using various techniques such as, for example, over-the-air or via a telephone call to the service provider.

Figure 13A:
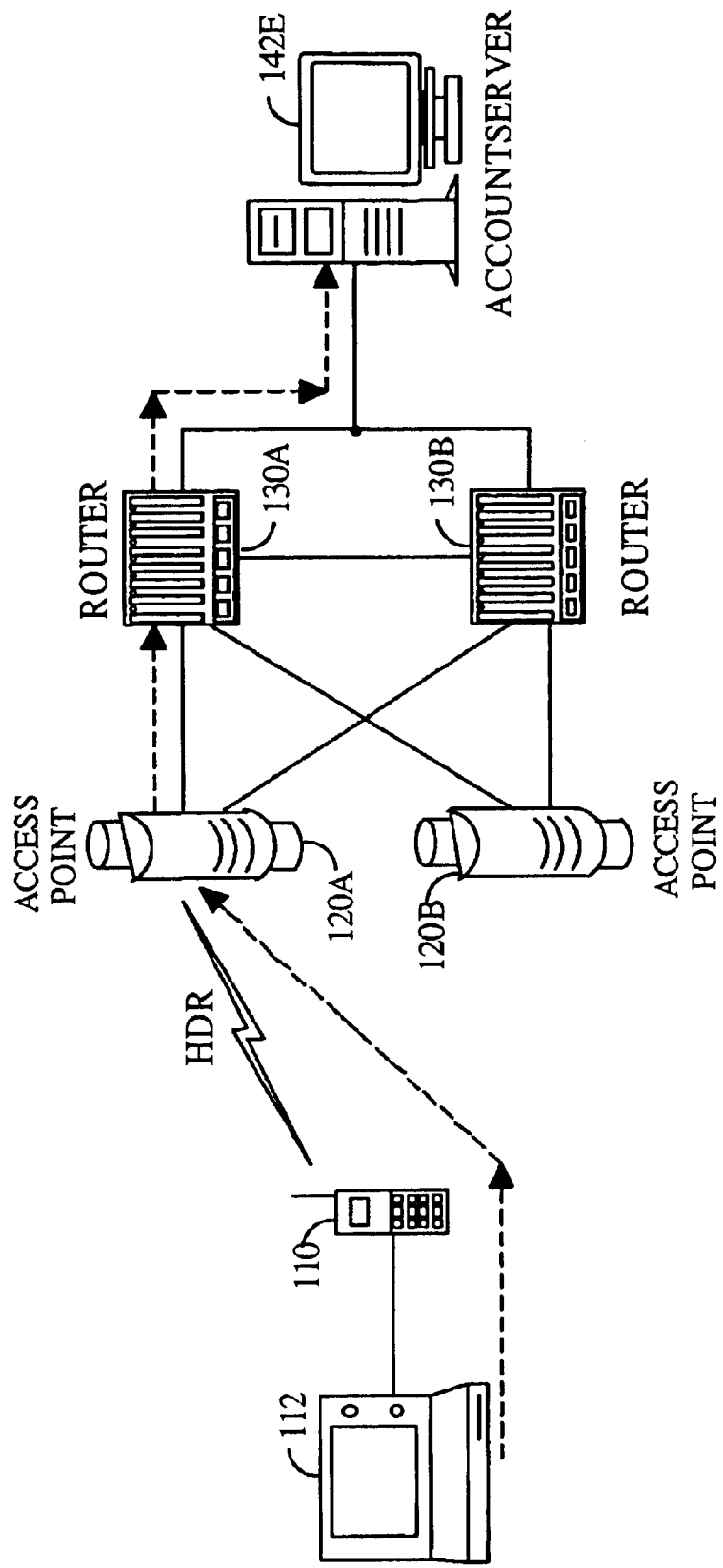
FIGS. 13A through 13D are diagrams that illustrate some embodiments of the activation process in the HDR system.

FIG. 13A is a diagram that illustrates the communication between various elements of the HDR system to perform over-the-air service activation. Access terminal 110 couples to client computer 112 that provides many of the user interface functions. Access terminal 110 communicates with access point 120A to interact with account server 142E, which facilitates many of the service activation functions, as described below.

Figure 13B:
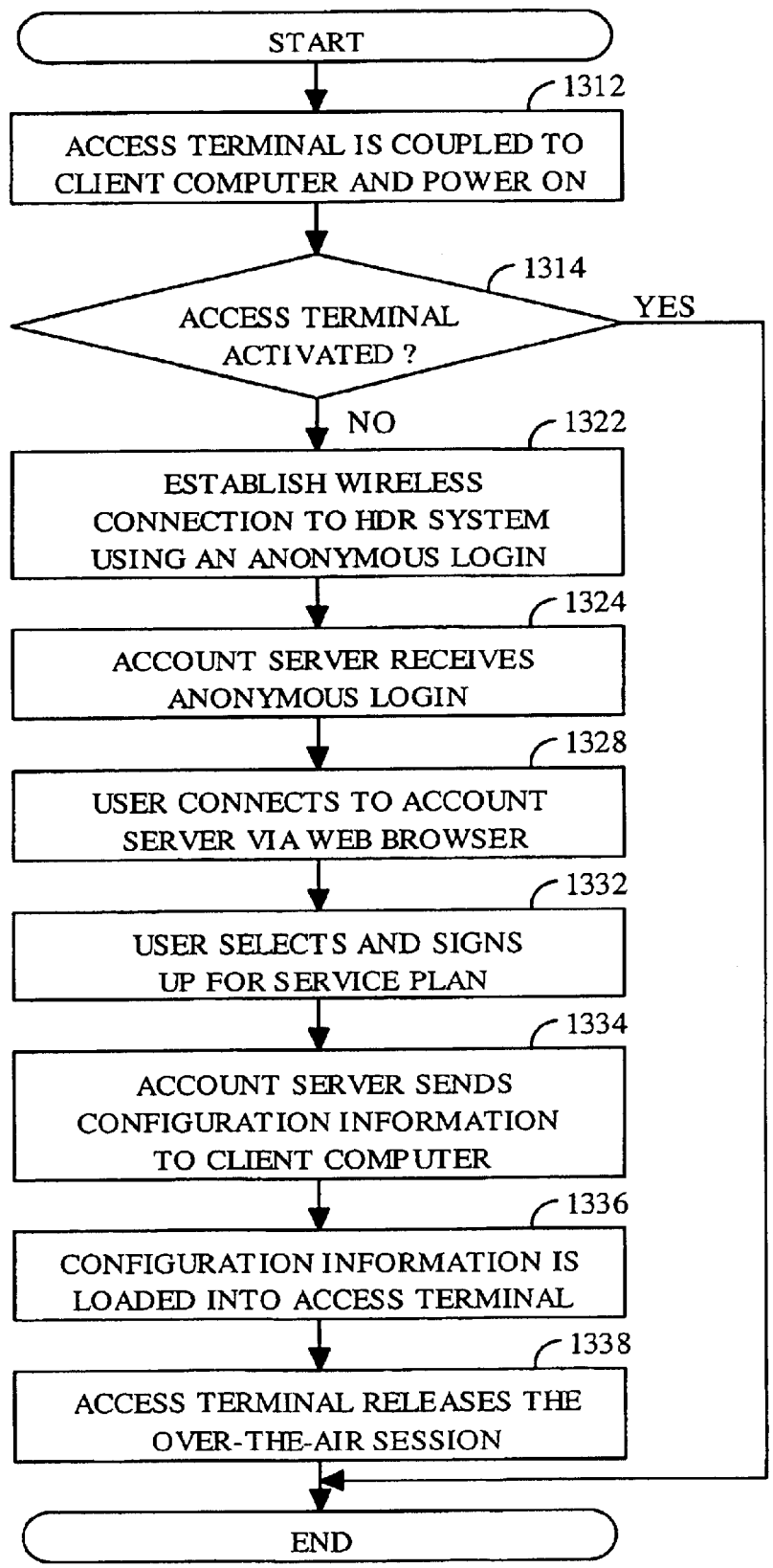

FIG. 13B is a flow diagram of an embodiment of the over-the-air service activation process in the HDR system. Initially, the access terminal 110 is coupled to the client computer and powered on, at step 1312. If the access terminal 110 determines that it has not been activated, at step 1314, it attempts to establish a wireless connection to the HDR system, at step 1322. In an embodiment, prior to active activation, the access terminal 110 can connect to the HDR system using an anonymous login. The elements within the HDR system (e.g., the access points 120) recognize the anonymous login and route it directly to the account server, at step 1324. These elements otherwise block unauthorized IP connections.

The user at the client computer then activates a web browser application (e.g., Netscape or Internet Explorer) and accesses a web page located at the account server, at step 1328. Through the web interface, the user is shown a list of available service plans and can select a particular service plan that best fits the user's needs, at step 1332. The user can sign up for the selected service by filling out the required information and submitting the required form of payment (e.g., entering credit card information). The payment transaction can be secured through the use of standard World Wide Web (WWW) security mechanisms supported by the user's web browser and the account server.

After the user selects and pays for the desired service plan, configuration information (described below) is sent over-the-air on the reverse link to the user's computer, at step 1334. The configuration information is then uploaded into the access terminal 110, at step 1336. Thereafter, the access terminal 110 releases the over-the-air session, at step 1338. A new session can then be initiated by the access terminal 110 to provide access to the subscribed services of the HDR system.

Figure 13C:
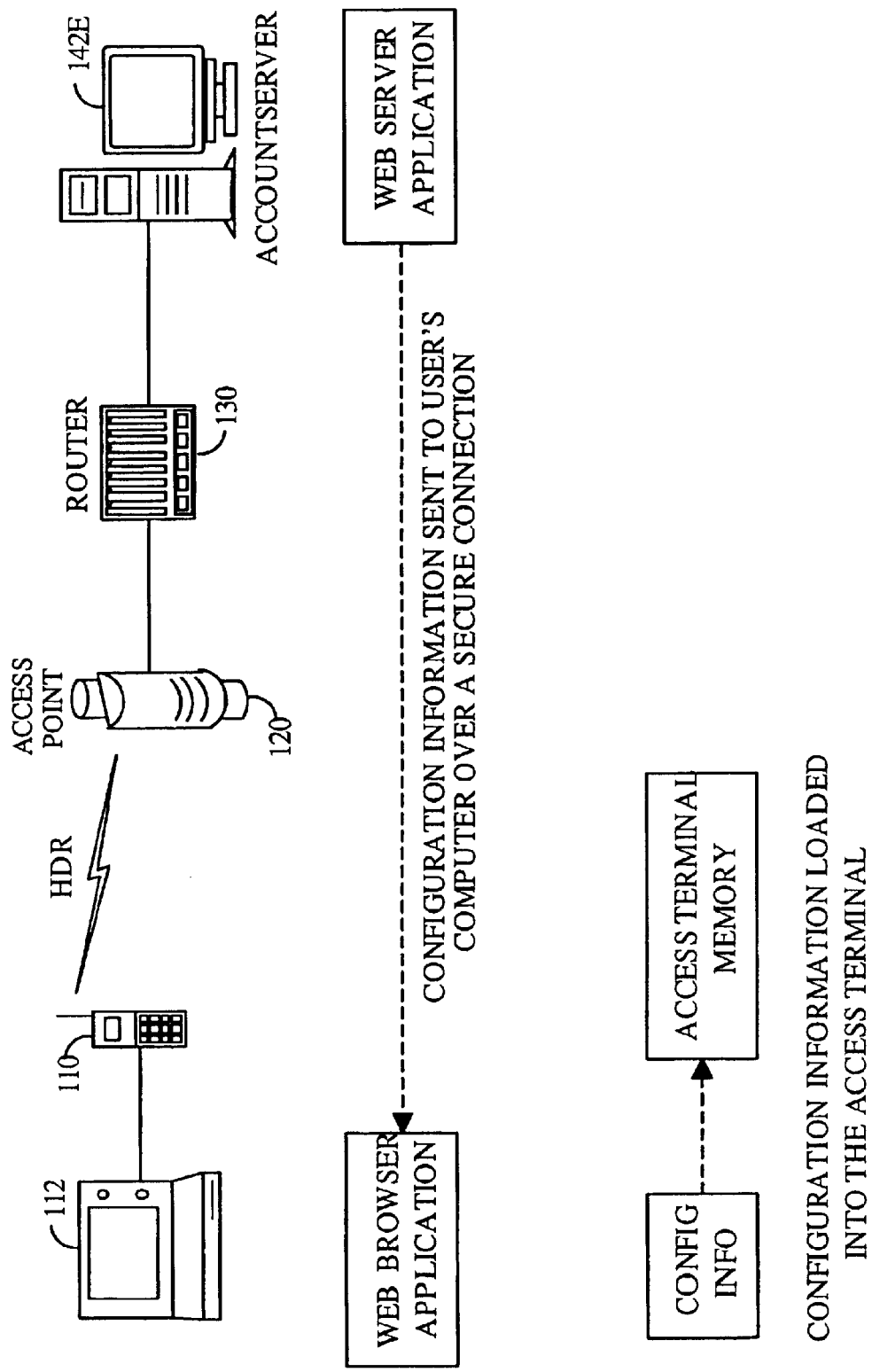

FIG. 13C shows an embodiment of an automatic activation of the access terminal 110. In this embodiment, the configuration information is sent by a web server application residing within the account server to the client computer via a secure connection that includes the HDR air-link. The configuration information is then automatically uploaded into the access terminal 110.

Figure 13D:
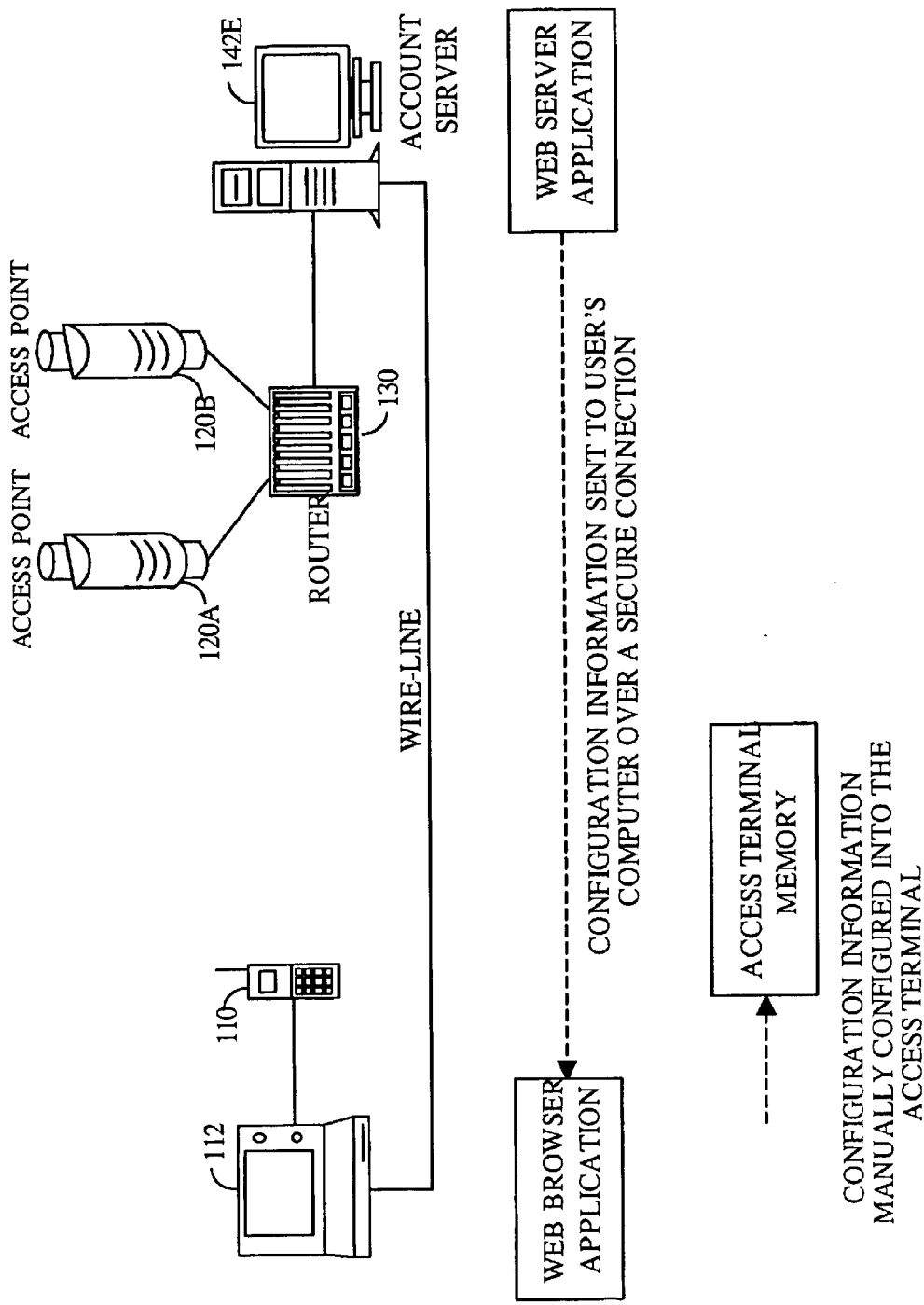

FIG. 13D is a diagram of an embodiment of a manual activation of the access terminal 110. Again, the access terminal 110 is initially coupled to the client computer and powered on. The user can dial into the account server via a wire-line connection (e.g., telephone line, cable, and so on), select a particular service plan, and pay for the selected plan. After the payment transaction is completed, configuration information is sent via the wire-line connection to a web browser application executed on the user's computer. Alternatively, the user can sign up for services via a telephone call to the service provider and be provided with the configuration information. In either case, the access terminal 110 is manually provisioned through the access terminal 110's web page.

The configuration information sent by the account server (i.e., the service provider) can include, for example, a unique identifier and password assigned to the user. In an embodiment, the unique identifier is in the form of "User at Realm" (e.g., User2501@wirelessISP.net). The identifier and password are subsequently used by the HDR system to recognize and authenticate the access terminal 110. The account server may also assign and provide to the access terminal 110 other pertinent information such as, for example, the user's e-mail address, the user's mail server, the news server, the web proxy server, and others. The user's e-mail address (e.g., Joe@wirelessISP.net) may not match the unique identifier.

In an embodiment, the user profile information is stored in the RADIUS server. Such information includes the user's unique identifier and password and any specific services subscribed by the user (e.g., a fixed IP address, a compulsory tunnel, or others). This information is later accessed during a session initiation to authenticate and configure the user. In an embodiment, confidential information is stored in the account server and may include, for example, the user's credit card number, billing address, and others.

Session Establishment

Once the access terminal 110 has been activated and configured, a session can be established to access the HDR system. In an embodiment, for ease of use and to provide a seamless user interface, a new session is automatically initiated by the access terminal 110 whenever it detects that a connection needs to be established. For example, a user may activate a web browser application on the user's computer and start browsing. When the URL of a web site is entered (e.g., www.qualcomm.com), the web browser application attempts to access the appropriate HDR system resources. The access terminal 110 then initiates a new session with the HDR system. In this manner, the start of the new session and connection requires no action from the user and becomes transparent to the user. The unique identifier and password assigned to the access terminal 110 are used by the HDR system for identification and authentication functions.

The HDR system is designed to provide a fast connection time. This allows the user's "natural state" to be dormancy when radio resources are not being used. The fast and transparent connection supported by the HDR system results in a convenient and highly desirable "always-on" user experience. If the user needs to start a new session, the access terminal 110 automatically starts the new session and connection with the HDR system. The user does not need to dial-in or enter user's unique identifier and password to establish the new session. If the user has already established a session and is dormant, the user can come out of the dormant state by simply sending or receiving information.

In an embodiment, each time a new session is established, the user is authenticated using the unique identity and password that are configured into the access terminal 110 during the service activation process. In an embodiment, the authentication process takes place during the Point-to-Point Protocol (PPP) phase of the session establishment when "simple IP" is used (described below). A Challenge Handshake Authentication Protocol (CHAP) is a mechanism that can be used for authentication during PPP link setup. When "mobile IP" is used, the CHAP at the PPP phase can be skipped since authentication will be performed at a later stage.

Figure 14A:
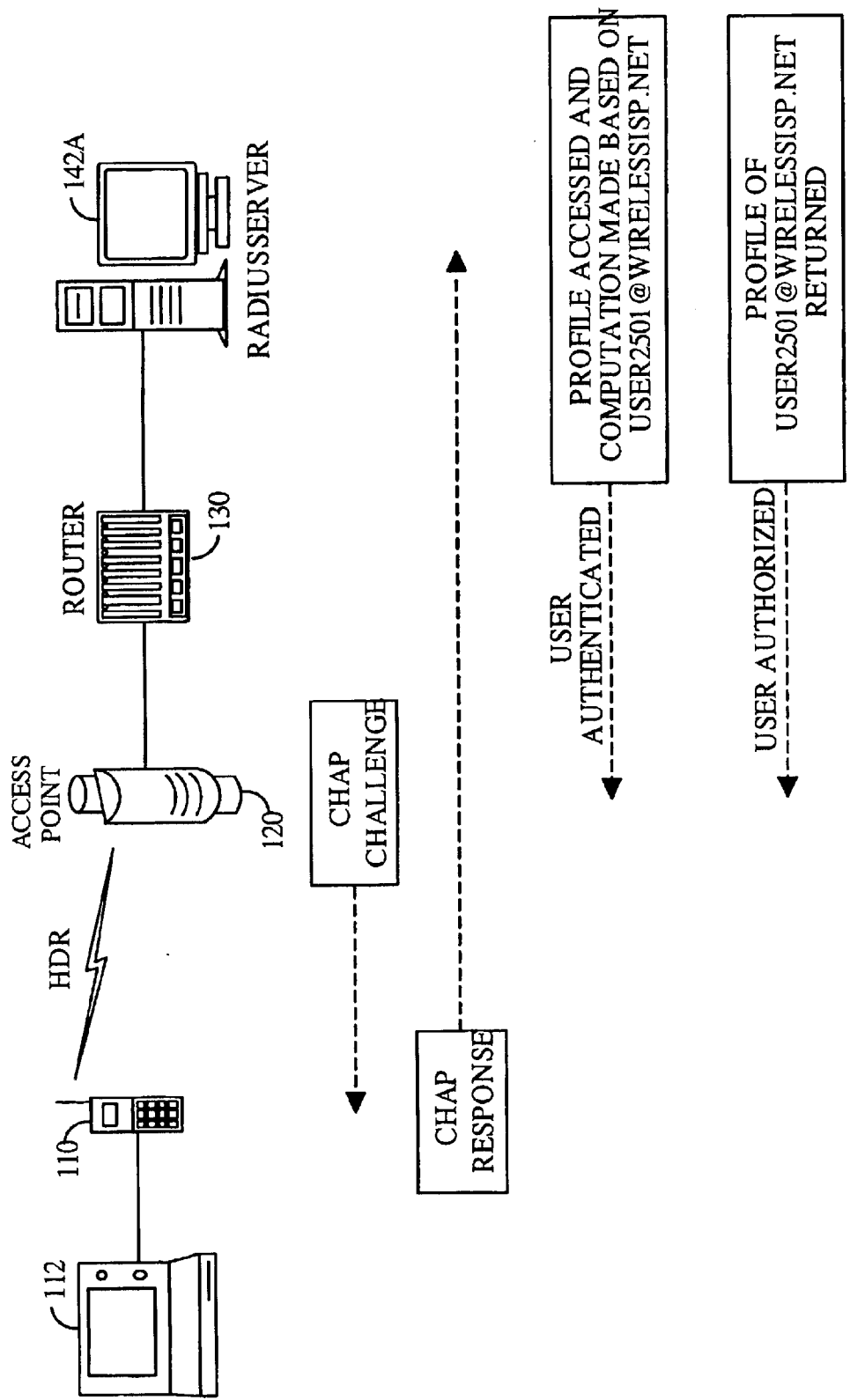
FIGS. 14A and 14B are diagrams that illustrate some embodiments of the user authentication and authorization process in the HDR system.

FIG. 14A is a diagram that illustrates an embodiment of a user authentication and authorization process in the HDR system. Initially, the access terminal 110 sends to the access point 120 a request to establish a session. In response, the access point 120 (e.g., the PDSN) issues a CHAP challenge message to the access terminal 110. The challenge message includes a challenge value generated with sender's key. The access terminal 110 then responds to the access point 120's challenge with a challenge response message that includes the user's unique identity and password and a challenge response value generated based, in part, on the challenge value obtained from the challenge message. The challenge response message is received by the access point 120, which forwards the challenge and challenge response messages to the RADIUS server. The RADIUS server then computes its own challenge response value and compares the generated challenge response value with the received challenge response value. If the two values are equal, then the user has been authenticated successfully. In this implementation, no user interaction is required in the authentication process.

Figure 14B:
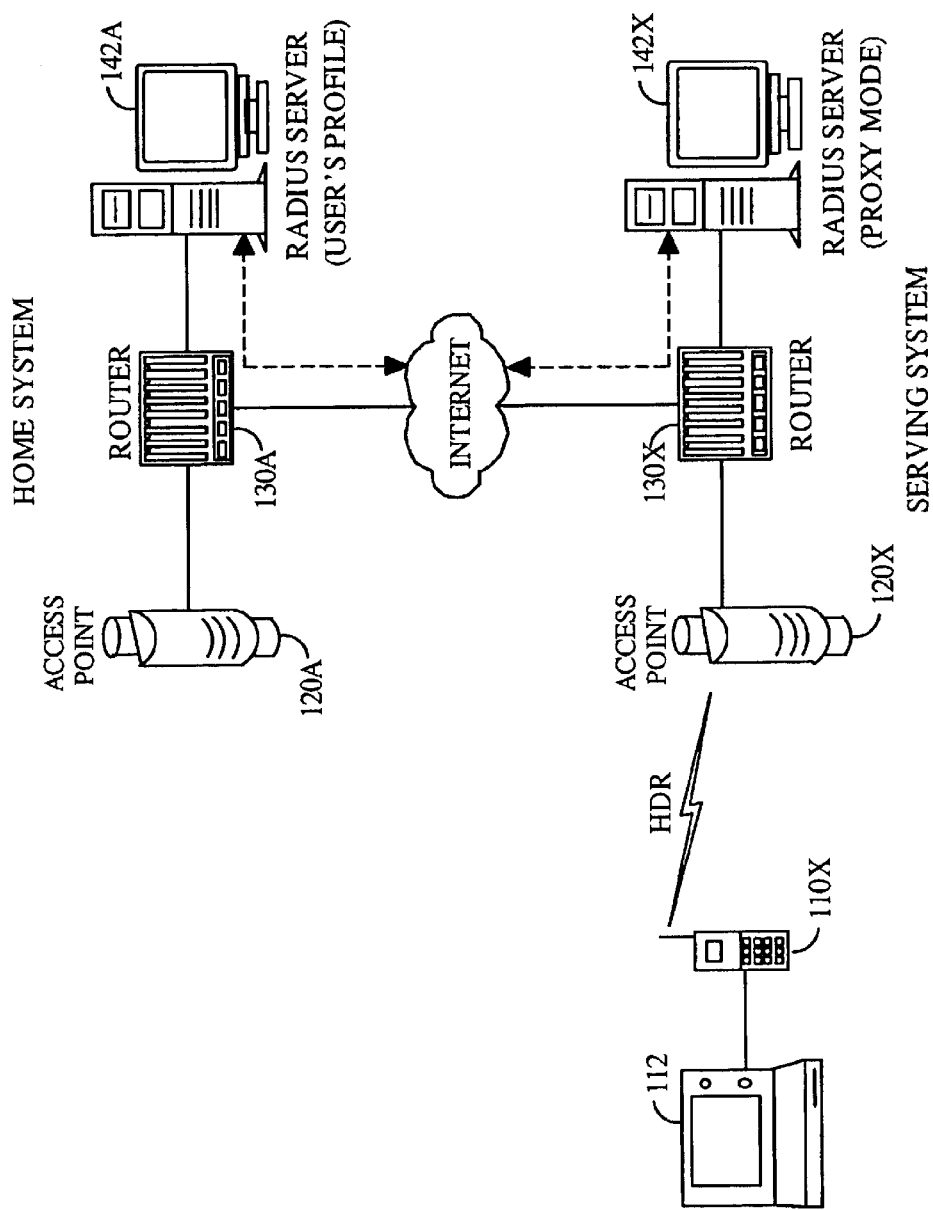

FIG. 14B is a diagram that illustrates an embodiment of a user authentication and authorization process for a roaming user in an HDR network. The HDR network can include multiple HDR systems (e.g., one HDR system employed for each city). In an embodiment, the HDR network supports roaming by an access terminal 110 from a home HDR system to a different serving HDR system. A roaming access terminal 110X initially establishes a session with an access point 120X in the serving HDR system. RADIUS server 142A of the home HDR system supports RADIUS proxy operation, which allows RADIUS server 142A of the home HDR system to forward messages to RADIUS server 142X of the serving HDR system based on the realm in the user's identifier (user@realm). Thus, RADIUS authentication, authorization, and accounting messages for a user homed in a different HDR system are automatically forwarded by the serving HDR system to the home HDR system.

IP Address Assignment

In an embodiment, each access point 120 is an element on the IP network and is associated with its own static domain name and IP address. The IP addresses for the access points 120 in the HDR system can be assigned by the HDR system and need not be globally routable.

In an embodiment, each access terminal 110 also operates as an element on the IP network and is identified by its own static or dynamic IP address, which may be assigned during the activation process or upon session initiation. In an embodiment, the HDR system is capable of allocating static and dynamic IP addresses. Various techniques can be used to assign IP addresses, one of which is described below.

Figure 15A:
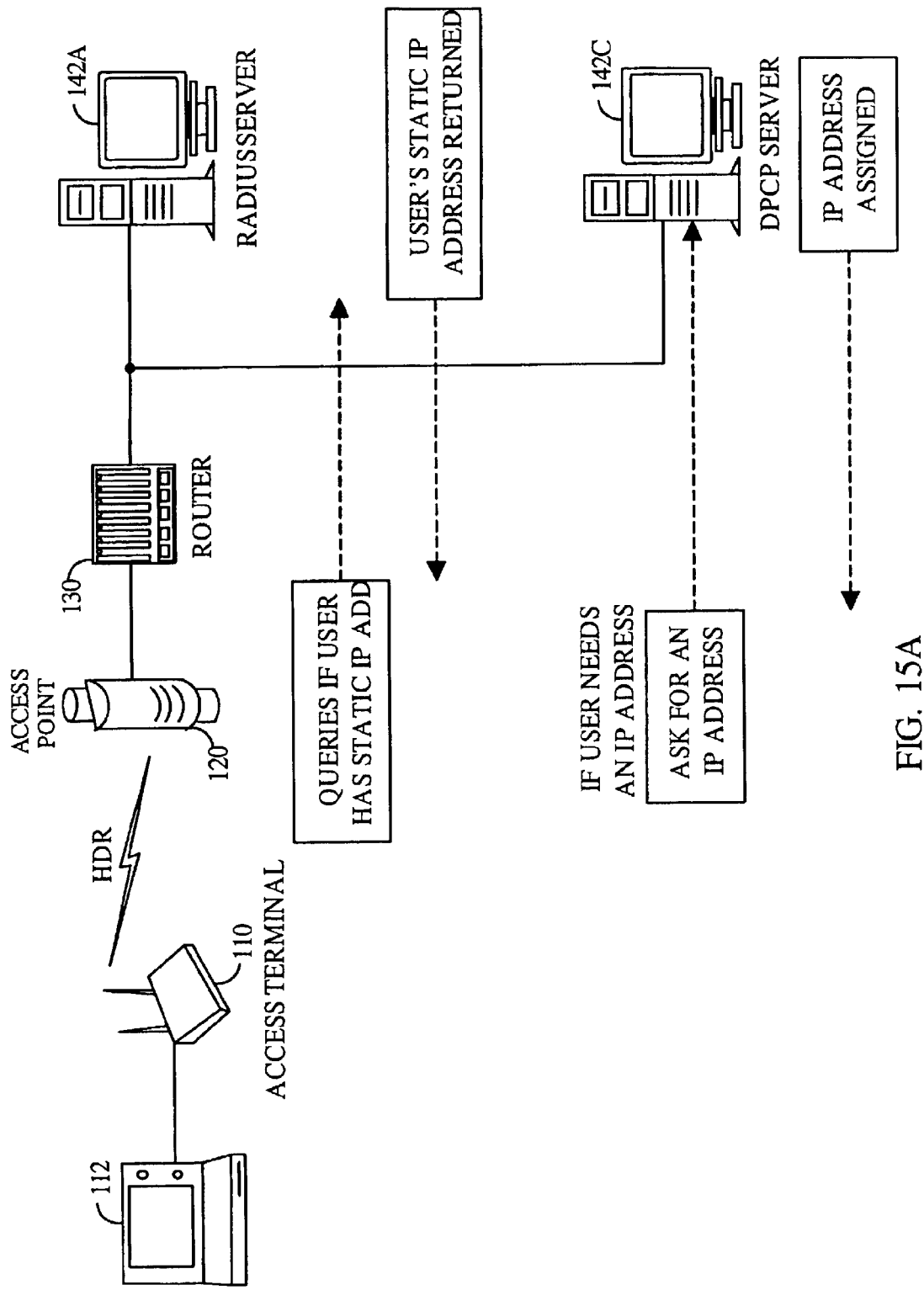
FIGS. 15A through 15C are diagrams that illustrate an embodiment of the IP address assignment process in the HDR system.

FIG. 15A is a diagram that illustrates the communication between various elements of the HDR system for assigning IP address. During session initiation, access terminal 110 communicates with access point 120 for an assignment of the IP address. Access point 120 then communicates with RADIUS server 142A via router 130 to retrieve the user's static IP address, if one exists. Access point 120 may communicate with DHCP server 142C for an assignment of an IP address if a static IP address does not exist.

Figure 15B:
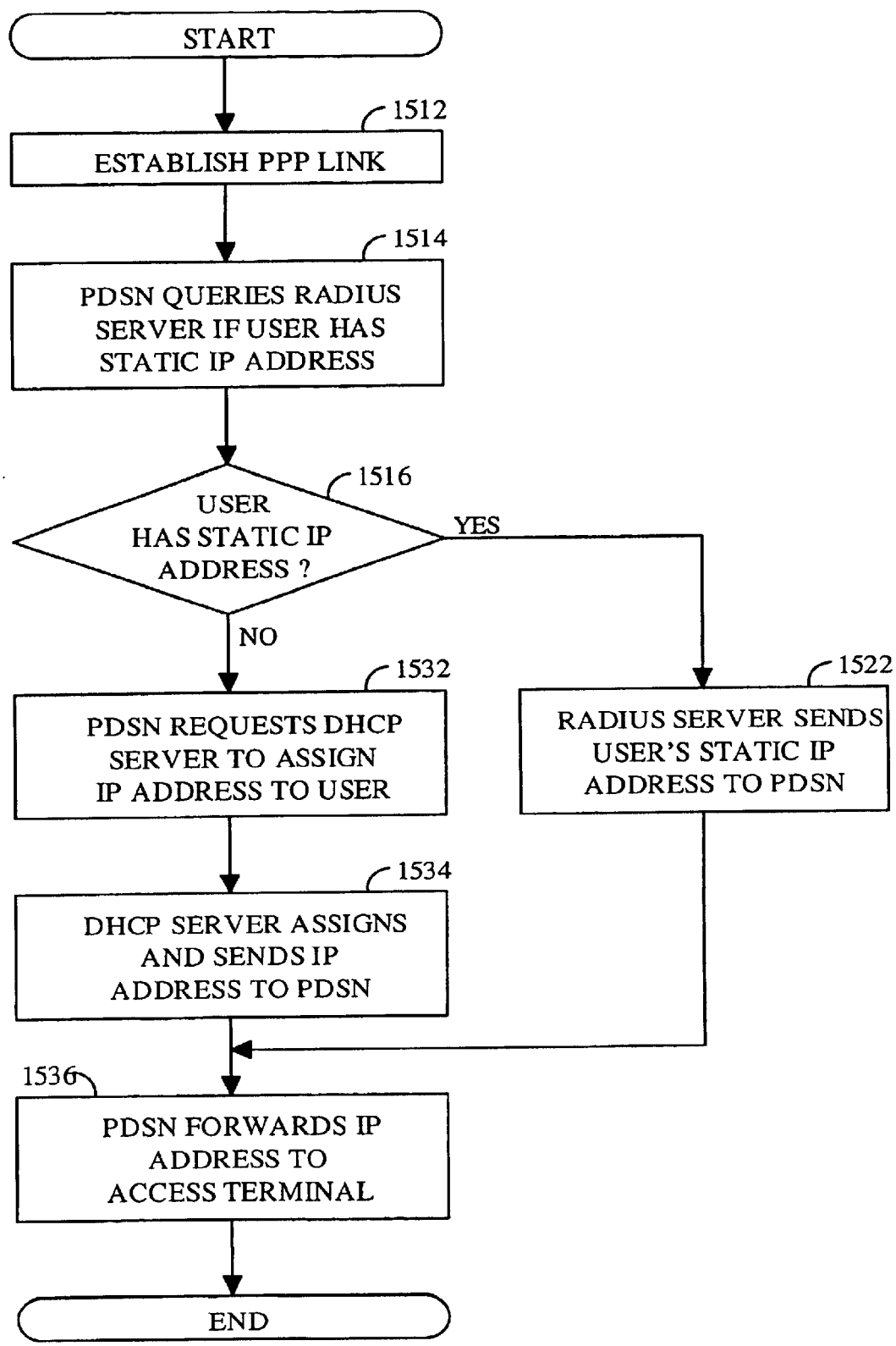

FIG. 15B is a flow diagram that illustrates an embodiment of an IP address assignment process in the HDR system. Initially, a PPP is established during session initiation, at step 1512. The PDSN then communicates with the RADIUS server that stores the user's profile and IP address information and queries if the user has a static IP address, at step 1514. The RADIUS server then views the user's profile and determines whether the user has a static IP address, at step 1516. If the user has a static IP address configured in the RADIUS server, the static IP address is retrieved and forwarded to the PDSN, at step 1522. The RADIUS server also replies if the user does not own a static IP address.

Otherwise, if the user's profile indicates that a static IP address has not been assigned, the PDSN communicates with the DHCP server and requests an IP address to be assigned to the user, at step 1532. The DHCP server then assigns an IP address and sends it to the PDSN, at step 1534. This assigned IP address may be static or may be leased as a temporary IP address. The PDSN renews the IP address lease as long as the session remains active. The PDSN then forwards to the access terminal 110 either the static IP address sent by the RADIUS server or the assigned IP address sent by the DHCP server, at step 1536. The user may maintain the IP address as long as it is served by a radio network, which has connectivity to the PDSN assigning the IP address.

Figure 15C:
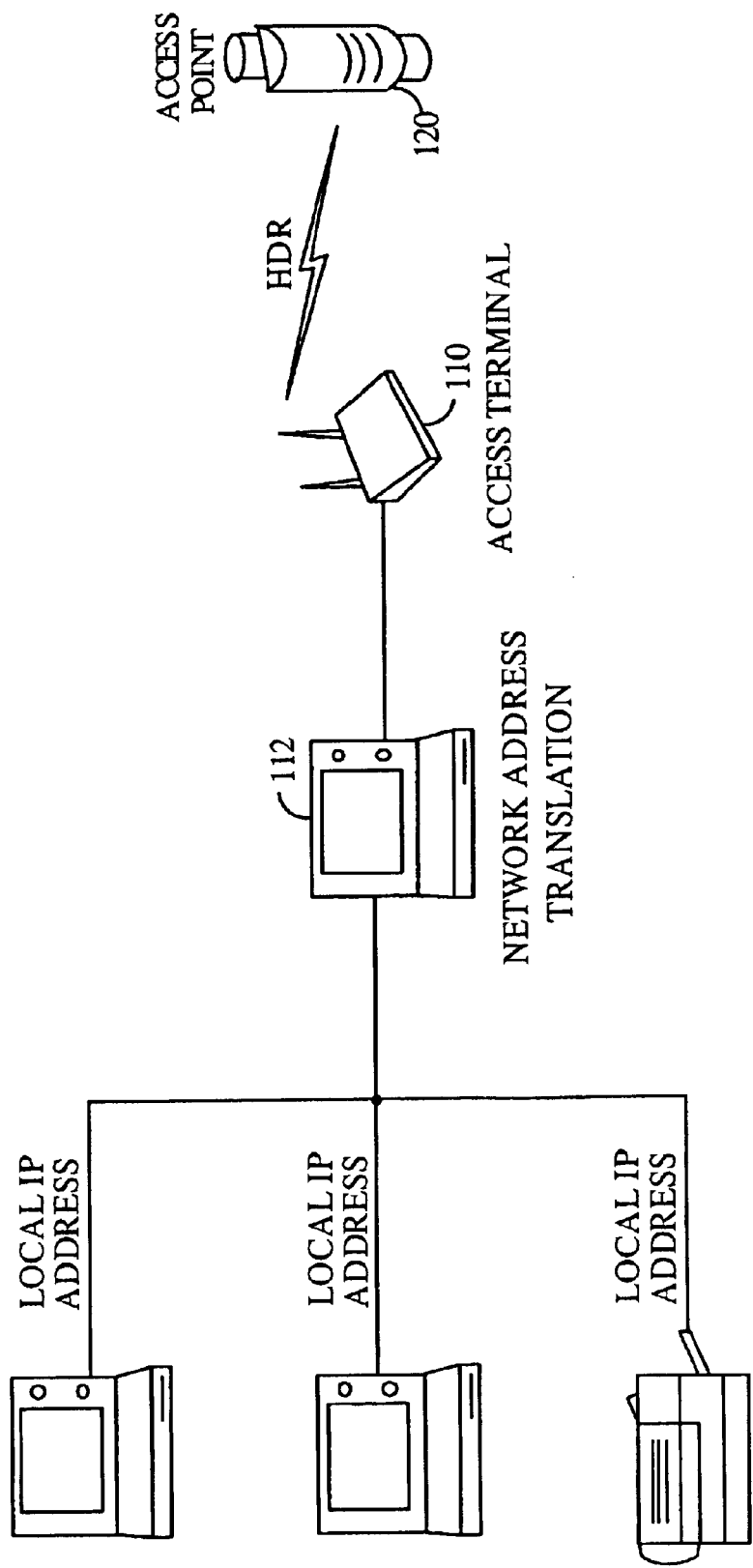

FIG. 15C is a diagram of a Local Area Network (LAN) coupled to an access terminal 110 and sharing a common IP address. In a particular environment (e.g., a household, a small business), multiple devices (e.g., computers, peripheral devices, and so on) can be coupled to the LAN (e.g., a local Ethernet network) to a single access terminal 110. Each device in the LAN may be assigned a local (non-globally routable) IP address. Network translation mechanisms can be used at computer 112 to translate the local IP addresses to a single IP address assigned to the access terminal 110. In this manner, multiple devices can be supported by a single access terminal 110 with a single IP address.

In an embodiment, the HDR system supports "simple IP" and "mobile IP" sessions. The access terminal 110 communicates with a particular PDSN in a simple IP session and may communicate with multiple PDSNs in a mobile IP session. In a specific implementation, for both simple and mobile IP, only one PPP session is supported between the access point and the PDSN at a time. The HDR system can also be designed to support different or additional IP sessions, and this is within the scope of the invention.

In simple IP, the PDSN assigns IP addresses and provides IP routing service to an access provider network. In an embodiment, the PDSN performs the following tasks in a simple IP session:

Establishes a PPP session to the access terminal 110 after the radio network opens a R-P connection to this access terminal 110.

Ends a PPP session if (1) there is no longer an underlying R-P session between the radio network and access terminal 110, or (2) the session remains inactive for a particular length of time.

For authentication, supports CHAP during PPP establishment.

Assigns dynamic IP addresses.

Acts as a RADIUS client and communicates user accounting information to the local RADIUS server.

In mobile IP, the PDSN provides the user's IP routing to a public IP network and/or secure IP routing service to predefined private IP networks. The user may use a static IP address belonging to its home network Home Agent (which is part of the mobility management) or may be assigned a dynamic IP address which belong to its home network Home Agent. In a specific implementation, in a mobile IP session, the user is able to maintain his IP address connectivity even when handed off between radio networks connected to different PDSNs. Mobile IP operation is supported by, and further described in RFC 2002, "IP Mobility Support," 1996; RFC 2004, "Minimal Encapsulation Within IP,") by C. Perkins, Oct. 1996; RFC 2004, "Applicability Statement for IP Mobility Suport," by J. Solomon, Oct. 1996; RFC 2006, "The Definitions of Managed Objects for IP Mobility Support Using SMIv2," D. Cong et al., Oct. 1996; (RFC 2344) "Reverse Tunneling for Mobile IP," by C. Montenegro, May 1998, Foreign Agent Challenge/Response, and NAI Extension, which are incorporated herein by reference. In an embodiment, the PDSN performs the following tasks in a mobile IP session:

Establishes a PPP session to the access terminal 110 after the radio network opens a R-P connection to this access terminal 110.

Ends a PPP session if (1) there is no longer an underlying R-P session between the radio network and access terminal 110, or (2) the session remains inactive for a particular length of time.

For authentication, bypass CHAP during PPP establishment to avoid unnecessary duplication since authentication is performed at a later stage of the mobile IP session.

Supports both static and dynamic home address assignments. For dynamic home address assignments, the PDSN acquires the home address from the mobile IP RRP. The PDSN uses a publicly routable and visible care-of-address.

Acts as a RADIUS client and communicates user accounting information to the local RADIUS server.

When an access terminal 110 moves from one PDSN to another during an active packet data session, a new PPP session is established. Mobile IP provides IP layer mobility management function that maintains communications across PDSNs. In order to maintain IP connectivity, the access terminal 110 initiates a PDSN to PDSN handoff by registering with its home agent, as specified in RFC 2002. PDSN to PDSN handoff for mobile IP thus involves establishment of a new PPP session, detection of a new foreign agent, and registration with the home agent. Simple IP does not support PDSN to PDSN handoff—thus a new session is initiated with the new PDSN and a new IP address is assigned.

Operating Modes

In an embodiment, the access terminal 110 can operate in one of a number of different operating modes as shown in FIG. 12. Such operating modes can include, for example, an active move, a dormant mode, and a suspended mode. Other operating modes or additional modes can also be supported and are within the scope of the invention.

Each of the supported operating modes represents a particular operating state of the access terminal 110. In an embodiment, the dormant mode refers to the period of time when an access terminal 110 and a radio network have an open session, do not have an open connection, and wherein the access terminal 110 operates in slotted mode. In slotted mode, the access terminal 110 only listens to the control channel during its slot and stays asleep the rest of the time to conserve battery power. In an embodiment, the suspended mode refers to the period of time when an access terminal 110 and a radio network have an open session, do not have an open connection, and wherein the access terminal 110 does not operate in a slotted mode. The suspended mode is similar to the dormant mode, except that a suspended access terminal 110 can wake up more quickly than a dormant access terminal 110 when activity is initiated by the network. The faster wake up time is possible because the access terminal 110 is not operated in slotted mode.

The dormant and suspended modes allow the HDR system to efficiently utilize the available air-link resources. These modes are entered by the access terminal 110 during periods of no activity. The dormant and suspended modes allow the HDR system to maintain the logical state of the user's session while releasing the resources associated with the air-link. The logical state may be identified by, for example, the PPP and higher layers as well as the radio link session information. The user's session can be kept alive, for example, based on the system's recognition of the air-link location update of the access terminal 110.

The dormant and suspended modes are well suited for the bursty nature of packet data services. During idle periods (e.g., when the user is composing an e-mail message), valuable air-link connection resources are not unnecessarily tied up and can be used by other users in the system. These modes effectively increase the number of subscribers that can be accommodated by the HDR system.

In an embodiment, a user enters the dormant or suspended mode based on his activity (or lack of activity), which can be measured by various techniques. For example, inactivity can be measured by a set of idle timers. One idle timer can be maintained by the user in the access terminal 110 and another timer can be maintained by the service provider at the network level. The smaller of these two timers can cause the user to enter the dormant mode.

Figure 16:
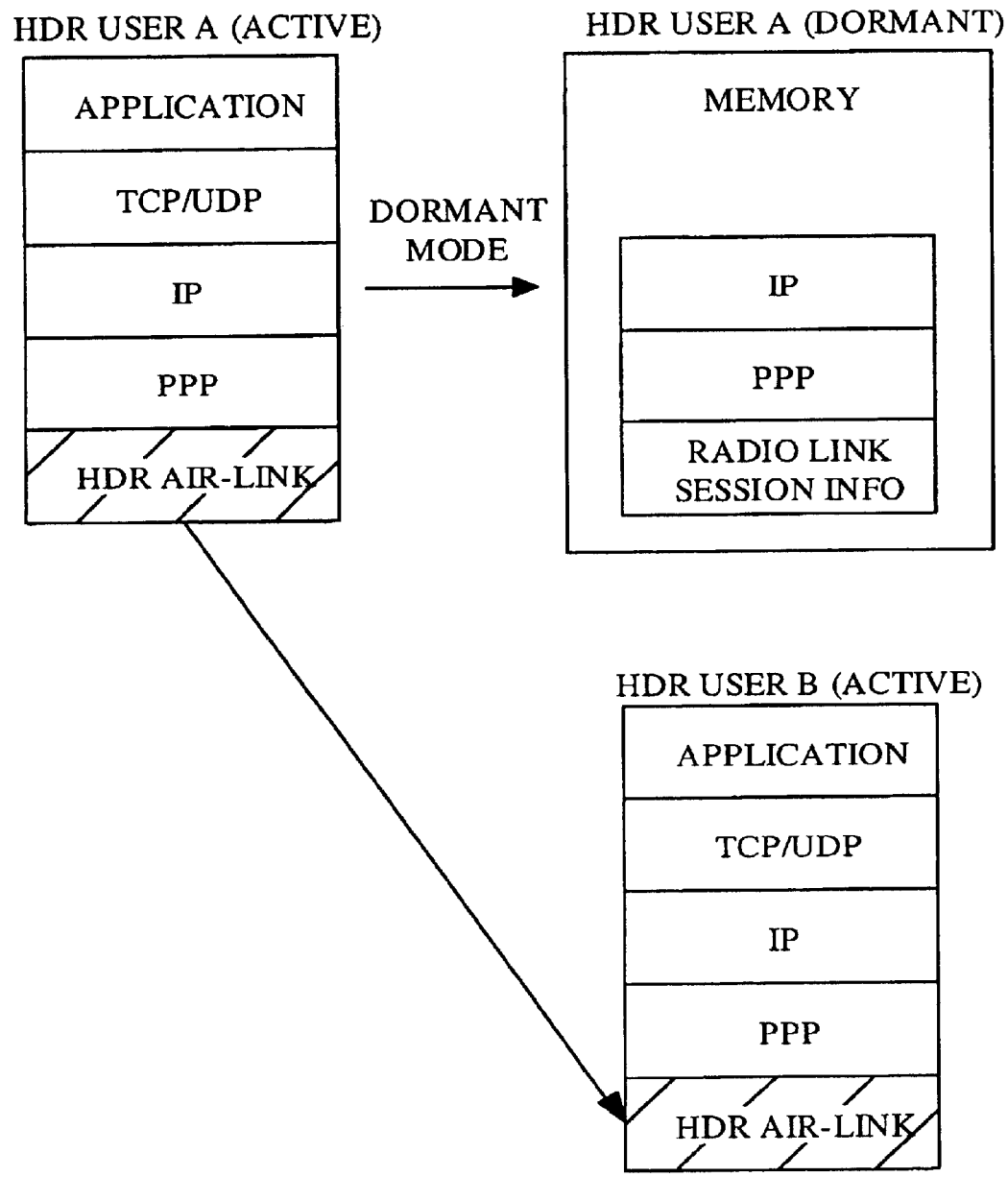
FIG. 16 is a diagram that illustrates the storage/retrieval of a user's session state information when the user enters/exits a dormant mode.

FIG. 16 is a diagram that illustrates the storage/retrieval of a user's session state information when the user enters/exits the dormant mode. In an embodiment, a memory is maintained at the MPC to store the session states of users that have established sessions with the radio network but are in the dormant mode. The session state information stored for a particular dormant user may include, for example, the user's protocol stack, the user's IP address, the identifier of the access terminal 110, and other session state information. As shown in FIG. 16, when user A enters the dormant mode, the user's session state information (e.g., the application through PPP layers and the radio link session information) is stored to memory but the air-link connection is relinquished. The lower layers are reset when the traffic channel is reconnected. The relinquished air-link can then be utilized by another user (e.g., user B) who has become active. When a user comes out of the dormant mode, the user's session state information is retrieved from memory and the radio link session information is used to re-establish the HDR air-link. Again, the dormant user's session can be kept alive based on the system's recognition of the access terminal 110's air-link location update.

In a specific implementation, to provide a seamless experience, a user can automatically come out of the dormant mode as the user starts sending or receiving data over the air. Since the user's session state information is maintained by the MPC during the dormancy, a connection can be re-established quickly (e.g., less than 0.5 second) and the user can quickly resume activity. The ability to store session state information and quickly re-establish a connection allows the dormant mode to be the "natural state" of users in the HDR system. Protocol stack is saved for the suspended mode in similar manner as for the dormant mode.

Push Services

The HDR system can be operated to provide "push services" to users that have become dormant or suspended. The push services may include, for example, information requested by the user (e.g., stock quotes, sport scores, news headlines, weather information, and so on) or information disseminated by the service provider (e.g., advertisement, announcements, and so on). The push services can be provided since the association between the user's IP address and access terminal 110 identifier are maintained during dormancy.

Figure 17:
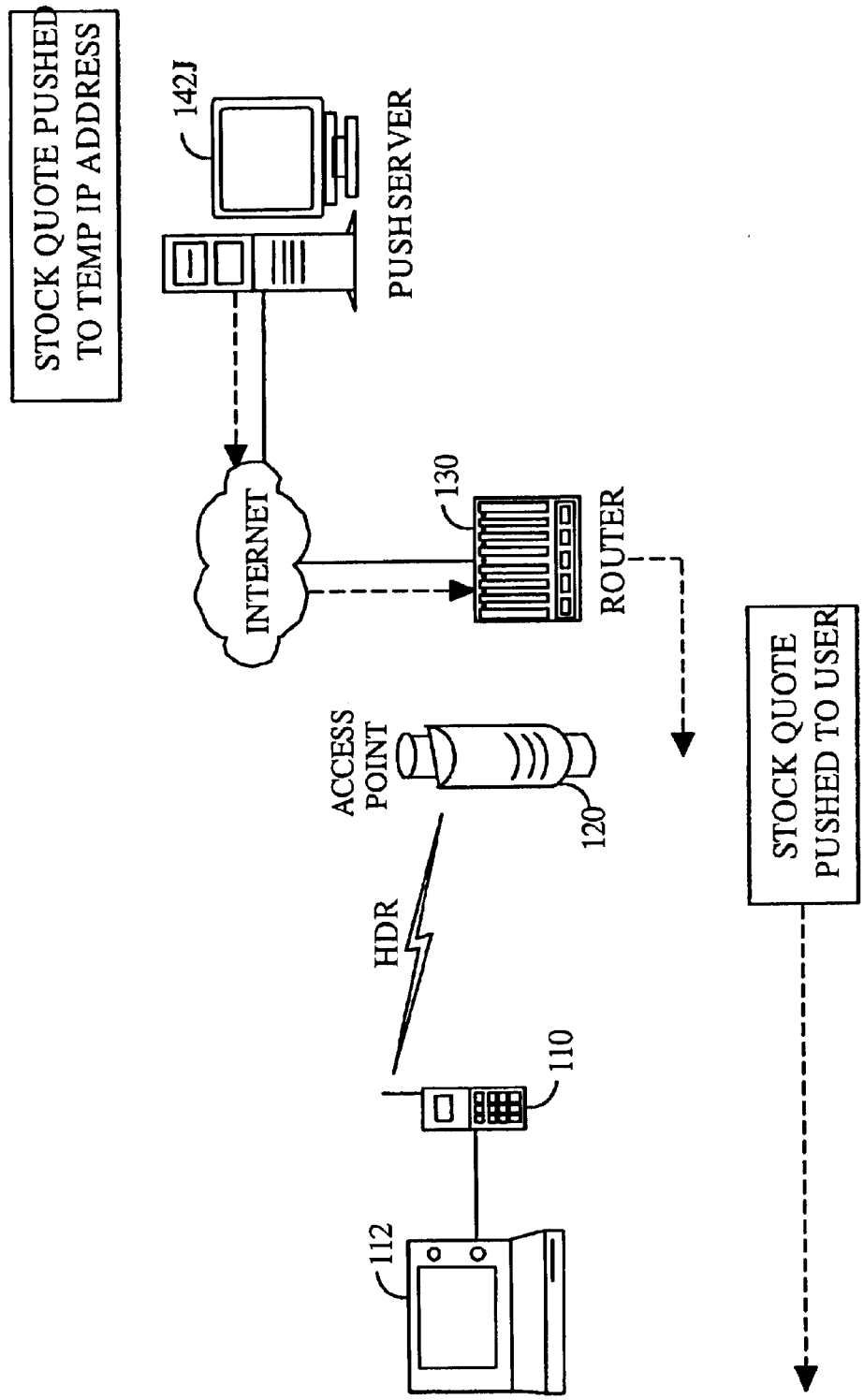
FIG. 17 is a diagram that illustrates the communication between various elements of the HDR system to provide push services.

FIG. 17 is a diagram that illustrates the communication between various elements of the HDR system to provide push services. Initially, a push server 142J sends push information (e.g., stock quote) to a user's IP address. The information is routed to the access point 120 serving the user associated with that IP address. If the user is in the dormant mode, the session state information is provided to the access point 120, which then re-establishes the air-link by paging the access terminal 110 having the identifier associated with the IP address. Once the air-link is re-established, the access point 120 sends the push information to the access terminal 110. If the access point 120 does not know the user's unique identity, it sends a request to the DHCP server for the user's unique identity. The DHCP server then bounds the IP address to the user's unique identity and informs the access point 120, which then sends the push information using this information.

Mobility and Hand-Offs

The HDR system is capable of supporting fixed, portable, and mobile access terminals 110. As used herein, a fixed access terminal 110 does not change its point of attachment to the HDR system (e.g., it communicates with a particular access point 120 for each session). A portable access terminal 110 can change its point of attachment to the HDR system, but not during an active connection. For example, a portable access terminal 110 may move its point of attachment for a new session or during dormancy. Pedestrian applications can be considered as portable in nature since they slowly move their point of attachment and the access terminal 110 can transparently be put in dormant mode while the change in attachment occurs. And finally, a mobile access terminal 110 moves its point of attachment while it has an active connection with the HDR system.

The HDR system allows a user to move among access points 120 and from one subnet to the next. In an embodiment, handoffs from one access point 120 to another are achieved on the reverse link of the HDR system using mechanisms similar to the soft handoffs mechanisms employed in the IS-95 CDMA systems. On the forward link of the HDR system, a "virtual soft handoff" is maintained since, at any given instance, a particular access terminal 110 only receives information from the access terminal 110 determined as the "best server" based on the quality of the communications link (e.g., as determined by continually measured signal-to-noise ratios).

Figure 18:
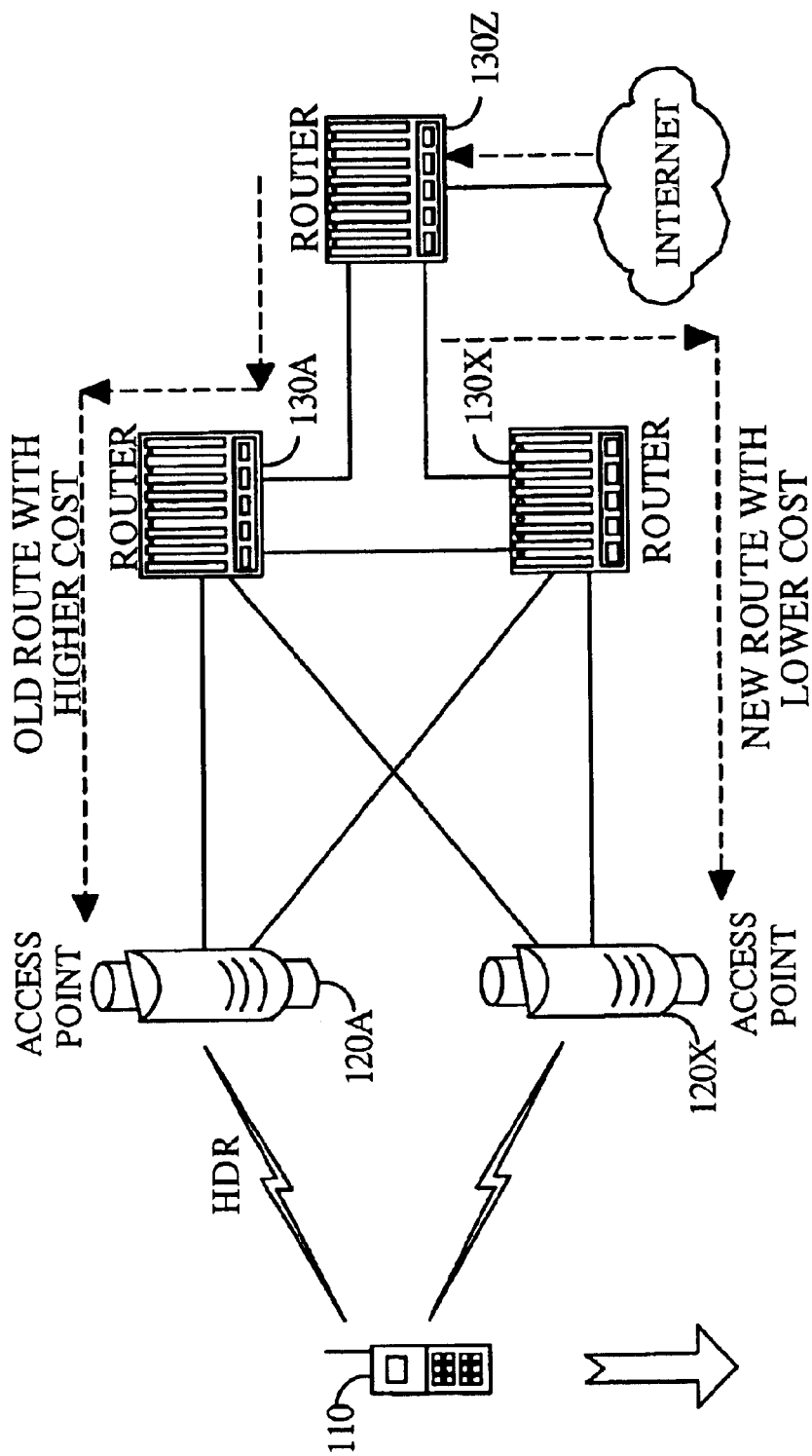
FIG. 18 is a diagram that illustrates mobility of the access terminal within the HDR system.

FIG. 18 is a diagram that illustrates the mobility of the access terminal 110 within the HDR system. Initially, access terminal 110 establishes a connection with access point 120A and communicates with this access point 120. As access terminal 110 moves throughout the HDR system, at some point it is determined that another access point 120X is the "best server" and access terminal 110 then attempts to acquire to access point 120X. When access point 120A realizes that access terminal 110 needs a new access point 120, it directs access point 120X to become the new access point 120. Access point 120X then installs a route to the nearest router 130x. Through the use of the OSPF protocol, the costs for the two routes will likely be different. When access point 120 has a more cost-effective route than the route through access point 120A, the new route is propagated through the HDR system and access point 120X assumes anchor responsibility. The higher cost route via access point 120A is then de-installed.

Referring back to FIGS. 6A through 6C, the HDR system may be installed along side a CDMA system or may be integrated with the CDMA system. For enhanced flexibility, handoff between the two systems can be supported and a dual-mode access terminal 110 can be designed to provide access to either an HDR access point 120 or a CDMA BTS. As the access terminal 110 moves about the HDR coverage area, the two systems can initiate seamless handoff on both the air-link and network sides. The dual-mode access terminal 110 can be used to provide mobile IP.

On the air-link side, the access point 120 can signal to the access terminal 110 when it is near the edge of the coverage area and that the neighboring cells are CDMA cells. This then causes a dual-mode access terminal 110 to search for both HDR system access point 120 and CDMA base station (e.g., search for both HDR pilots and CDMA pilots). If a CDMA pilot is detected, the air link may be handed from the HDR system to the CDMA system, for example, in a manner similar to the handoff between IS-95 and AMP systems. The handoff between the HDR and CDMA systems can occur in the active or dormant mode (e.g., as the access terminal 110 is monitoring its environment during dormancy).

On the network side, once the user is in the CDMA system, the access terminal 110 performs a mobile node registration with a foreign agent in the CDMA system. The mobile node registration occurs over the air, and the access terminal 110 comes out of dormancy for this registration. Once registered, the foreign agent notifies the user's home agent as to the current point of attachment. Packets destined for the user are then forwarded to the foreign agent in the CDMA system.

Access Terminal

Figure 19:
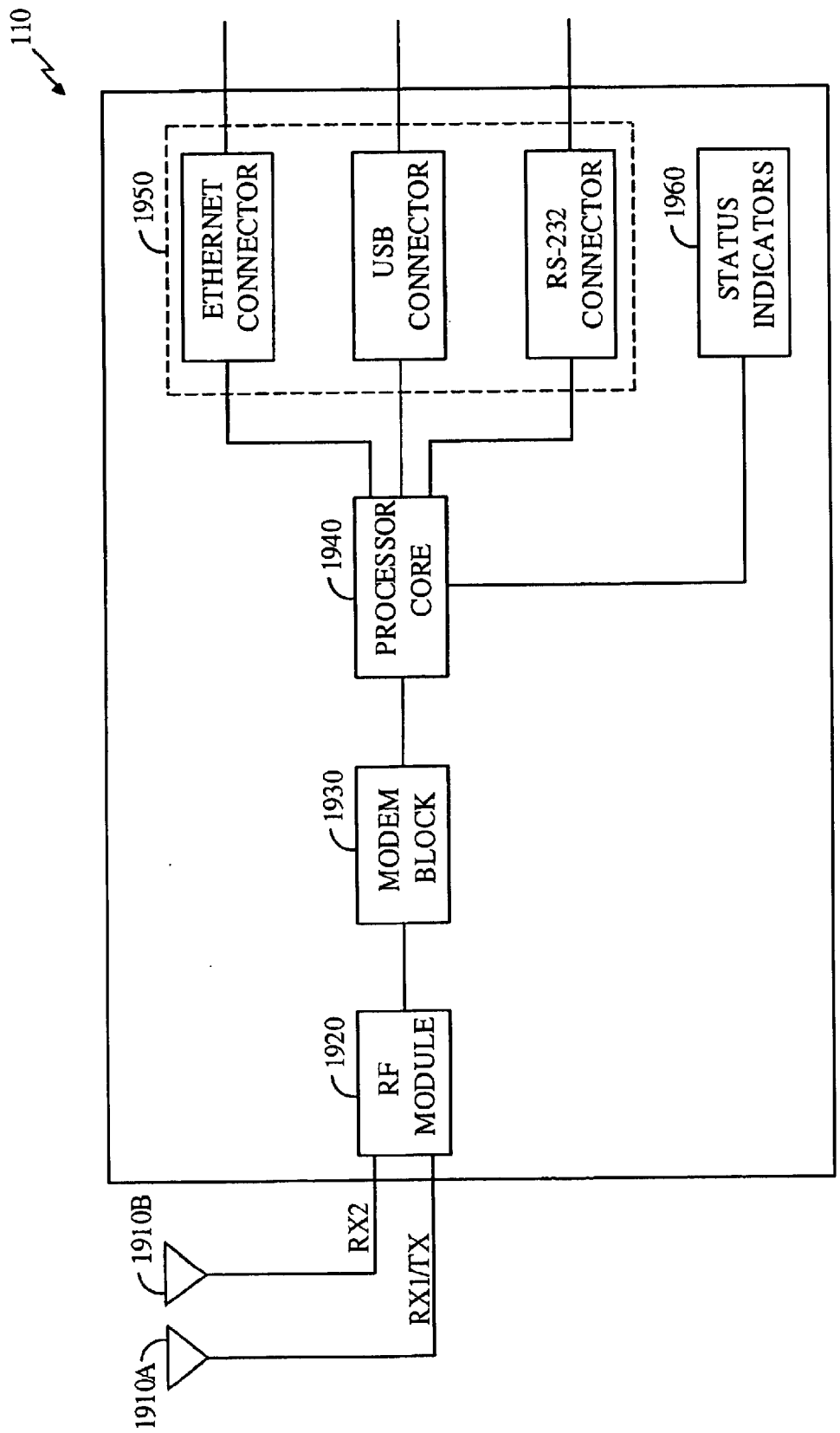
FIG. 19 is a simplified block diagram of a specific embodiment of the access terminal.

FIG. 19 is a simplified block diagram of a specific embodiment of access terminal 110. Access terminal 110 includes one or more antennas 1910A, 1910B, an RF module 1920, a modem block 1930, a processor core 1940, and an interface unit 1950 coupled in series. Processor core 1940 further couples to status indicators 1960. The elements of access terminal 110 can be designed in various manners. For example, a specific design for some of the elements of access terminal 110 (e.g., RF module 1920, modem block 1930) is described in further detail in the aforementioned U.S. patent application Ser. No. 08/963,386, now U.S. Pat. No. 6,574,211. A brief description of the functions of the elements of access terminal 110 is described below.

In an embodiment, RF module 1920 includes two receive chains capable of processing two received signals independently and one transmit chain for processing a transmitted signal. The two autonomous receive chains allow access terminal 110 to benefit from receive diversity combining in the forward link. Each of the receive chains couples to a respective antenna 1910 that provides one of the received signals. The transmit chain shares an antenna with one of the receive chains.

Modem block 1930 processes signals on the forward and reverse links. On the forward link, modem block 1930 receives two autonomous signals from RF module 1920, demodulates and decodes the received signals with the assistance of processor core 1940, and forwards the received data to processor core 1940 for further processing. On the reverse link, the transmit data from processor core 1940 is received by modem block 1930 and encoded, modulated, filtered, and converted to a baseband signal that is then forwarded to RF module 1920 for further processing.

Processor core 1940 performs the call processing, modem initialization, and monitoring functions, and further performs the data processing and handling functions for access terminal 110.

Interface unit 1950 provides interconnection between access terminal 110 and one or more computers, devices, and appliances. Interface unit 1950 can be designed to support one or more interfaces such as, for example, Ethernet, Universal Serial Bus (USB), serial, and others. These various interfaces are summarized in Table 1. Other interfaces can also be supported and are within the scope of the invention.

TABLE 1

| Interface | Standard | Connector Type |
| --- | --- | --- |
| Ethernet | IEEE 802.3 Type 10BaseT | 8pos-4pin RJ45 |
| USB | Universal Serial Bus Specification Revision 1.1 | 4pin USB Series B |
| Serial | EIA/TIA-574 | 9pin DSUB |

Status indicators 1960 provide indications of the operating state and conditions of access terminal 110. In an embodiment, status indicators 1960 includes a number of light emitting diodes (LEDs) of various colors used to indicate the state and conditions of access terminal 110. These LEDs are summarized in Table 2. Additional (e.g., three red) LEDs can also be provided as the received signal strength indicators. Other LEDs or other types of status indicators can also be used and are within the scope of the invention.

TABLE 2

| Name | Color | Definition |
| --- | --- | --- |
| Power | Green | Indicates the presence of regulated power. |
| Service | Green | Indicates the signal waveform has been acquired. |
| TX data | Amber | Flashes when packets are being transmitted over the air. |
| RX data | Amber | Flashes when packets are being received over the air. |

Access terminal 110 can be designed to conform to various specifications depending on the particular system requirements. As an example, the access terminal can be designed to conform to the specifications listed in Table 3.

TABLE 3

| Parameters | Specifications | Unit |
| --- | --- | --- |
| Air Interface | HDR CDMA | |
| Modulation | Spread Spectrum | |

TABLE 3-continued

| Parameters | Specifications | Unit |
| --- | --- | --- |
| RF Waveform Compatibility | IS-95 RF Compatible | |
| Frequency Carrier | 1.25 | MHz |
| Frequency Band: | | |
| Forward Link | 1930–1990 | MHz |
| Reverse Link | 1850–1910 | MHz |
| Peak Reverse Link Tx Data Rate | 307.2 | Kbps |
| Peak Forward Link Rx Data Rate | 2457.6 | Kbps |
| Power Output | 0.6 | Watt |
| Interfaces: | | |
| 10BaseT Ethernet | 10 | Mbps |
| USB | 1.5 | Mbps |
| RS-232 Serial Port | 115 | Kbps |

The functionality of access terminal 110 can be implemented as a stand-alone unit or integrated into a subscriber station (e.g., cellular phone) used for CDMA systems such as, for example, an IS-95 system, a CDMA-2000 system, or others. The dual-mode unit can share some of the circuitry such as the RF components and ASICs. Numerous implementations of access terminal 110 are possible and are within the scope of the invention.

Access Point

Various embodiments of access point 120 can be designed and are within the scope of the invention. For example, FIG. 3B shows a simplified block diagram of the access point 120 for a distributed MPT architecture and FIG. 4B shows a simplified block diagram of the access point 120 for a distributed MPC architecture. In these designs, the access point 120 includes one or more MPTs 126 (three MPTs 126 are shown in FIGS. 3B and 4B) coupled to a network interface 128. In the distributed MPC architecture, the access terminal 110 further includes an MPC 124 that couples to MPTs 126 and network interface 128.

Each MPT 126 performs data processing and supports a single sector. In the forward path, MPT 126 receives IP packets from the backhaul link via network interface 128, processes the IP packets to generate baseband signal, and modulates the baseband signal for transmission. In the reverse path, MPT 126 conditions, demodulates, and processes the received signal to generate digital data that is sent to the BACKHAUL link via network interface 128. MPT 126 also performs some of the Link Access Control (LAC) and Media Access Control (MAC) functions.

MPT 126 includes an RF transceiver module that perform the RF signal conditioning and interfaces with the antenna. The RF transceiver module includes, for example, the transmit power amplifier, low noise amplifiers, transmit and receive filters, a duplexer, and other RF components. The duplexer multiplexes a receive link with a transmit link on a single antenna. For some low coverage applications, three "patch" antennas mounted on the MPTs can be utilized instead of conventional antennas.

MPC 124 performs the radio link controller functions such as, for example, call processing, selection processing, and others. MPC 124 is also responsible for the Radio Link Protocol (RLP) and some of the Link Access Control (LAC) and Media Access Control (MAC) functions.

Network interface 128 provides the protocols and transport mechanisms required for access point 120 to interface with the external IP network. For example, network interface 128 implements the Point-to-Point Protocol (PPP) and the RADIUS protocol and also includes an integrated router that supports, for example, OSPF and IPSec protocols. Network interface 128 can also be designed to provide Foreign Agent capability.

Network interface 128 further provides the physical interfaces for connections to power supplies, the BACKHAULS (e.g., via T1/E1 or Ethernet), GPS antenna, alarm contacts, and others. Network interface 128 also typically includes a serial port connection for interfacing to an external computer for local configuration and provisioning. Network interface 128 may also include an interface to the MPTs. Network interface 128 performs AC power conversion and conditioning and supplies DC power to other subsystems in access point 120. Access point 120 supports external alarm inputs and external relay contact outputs that are configurable by the system operator.

Each access point 120 is typically associated with a GPS receiver that provides synchronization with the GPS satellite constellation. The GPS receiver can be located (e.g., up to 2000 feet) away from the access point 120. In the event that synchronization with the GPS satellite constellation is lost, the access point 120 can "freewheel" and maintain synchronization with other access points 120 for a particular time period (e.g., six hours or more).

The MPTs and MPC (if one is present) for access point 120 can be implemented in multiple units that can be located (e.g., up to 2000 feet) away from each other. In this design, remote I/O modules can be used to provide the physical interfaces between the units. The remote I/O modules can interconnect via wireline or wireless links (e.g., RF, optical, and so on).

Access point 120 can be designed to conform to various specifications depending on the particular system requirements. As an example, the access point 120 can be designed to conform to the specifications listed in Table 4.

TABLE 4

| Parameters | Specifications | Unit |
|---|---|---|
| Air Interface | HDR CDMA | |
| Modulation | Spread Spectrum | |
| RF Waveform Compatibility | IS-95 RF Compatible | |
| Frequency Carrier | 1.25 | MHz |
| Coverage Radius | 25 | Km |
| Frequency Band: | | |
| Forward Link | 1930–1990 | MHz |
| Reverse Link | 1850–1910 | MHz |
| Number of Carriers per Access Point | 1 with 3 sectors 1–3 with 1 sector | |
| Number of Sectors per Access Point | 1, 2, 3 | |
| Backhaul Interface | T1/E1, 100BaseT Ethernet | |
| Number of T1/E1 Spans per Access Point | 1–5 | |
| Throughput per Carrier per Sector | | |
| Peak Forward Link | 2457.6 | Kbps |
| Peak Reverse Link | 307.2 | Kbps |
| Average Forward Link (K = 1) | 600 | Kbps |
| Average Forward Link (K = 3) | 1300 | Kbps |
| Average Reverse Link | 300 | Kbps |
| Power Output per Sector | 15 | Watt |

As noted above, each access point 120 includes one or more MPTs 126. Each MPT 126 performs the signal conditioning and supports a single sector. Multiple MPTs 126 can be deployed on the same RF carrier for a multi-sector implementation or on different RF carriers to support up to three RF carriers in an omni or sectorized configuration.

Figure 20:
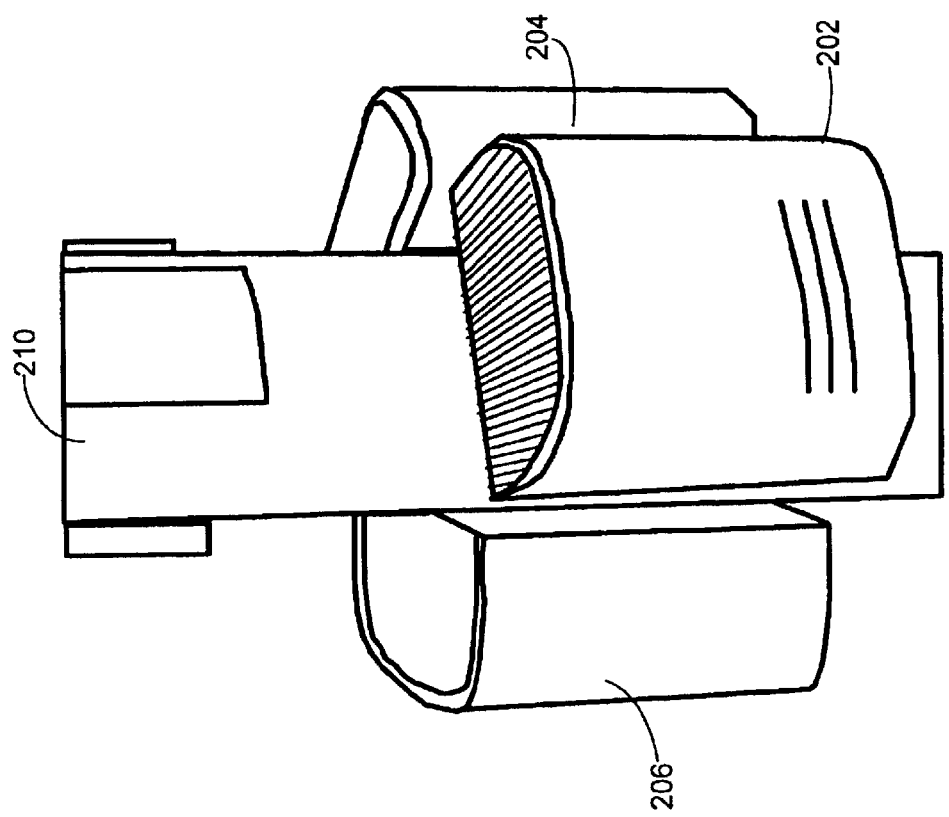
FIG. 20 is a diagram of a deployment of multiple access points on a pole.

FIG. 20 is a diagram of a deployment of three access points 202, 204, 206, similar to AP 120 on a pole 210. In an embodiment, each access point 120 includes one to three MPTs 126, one network interface 128, and zero or one MPC 124. Each MPT 126 provides the signal processing for IP packets and includes the signal conditioning circuitry to support signal transmission and reception via a respective antenna. Each access point 202, 204, 206 may be deployed in an omni configuration or a 3-sectored configuration (as shown in FIG. 20). For the design shown in Table 4, each sector of access point 202, 204, 206 can provide a peak data rate of over 2.4 Mbps on the forward link from the access point 120 to the access terminal 110 and a peak data rate of over 300 kbps on the reverse link from the access terminal 110 to the access point 120. These peak data rates can be achieved using the designed described in the aforementioned U.S. patent application Ser. No. 08/963,386, now U.S. Pat. No. 6,574,211. Other peak data rates may be obtained based on other designs. Based on Internet application usage patterns, hundreds of users can be supported per sector by these peak data rates.

In an embodiment, each access point 120 202, 204, 206 is manufactured as separate units enclosed within its own housing suitable for the environments (e.g., outdoors, indoors) in which it is deployed. The modular design of access point 120 allows it to be easily deployed and replaced in the field.

As noted above, an access point 120 can be co-located with other CDMA products (e.g., an IS-95 BTS) in the same cell site and share the same antenna. The antenna sharing may be achieved with the use of a Receive Multi-Coupler (RMC) unit that supports the sharing of two antennas per sector when operating two frequency assignments (e.g., two 1.25 MHz carriers). In this scenario, one frequency assignment is used by the HDR access point 120 and the other frequency assignment is used by the CDMA BTS. The RMC unit reduces the number of normally required antennas by half. One RMC unit is used for each sector and can be mounted in similar manner as the access point 120. RMC units are known in the art and not described in further detail herein.

The elements of the access terminals 110 and access points 120 can be implemented in various manners. For example, these elements can be implemented using one or more Application Specific Integrated Circuits (ASICs), Digital Signal Processors (DSPs), micro-controllers, microprocessors, other electronic circuits designed to perform the functions described herein, or a combination thereof. Also, some of the functions described herein can be implemented with a general-purpose processor or a specially designed processor operated to execute instruction codes that achieve the functions described herein. Thus, the elements of the access terminals 110 and access points 120 described herein can be implemented using hardware, software, or a combination thereof.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A wireless packet data communications system comprising:
    a plurality of modem pool transceivers, each modem pool transceiver configured to receive and process data packets to generate a modulated signal suitable for transmission over a wireless terrestrial communications link;

one or more modem pool controllers operatively coupled to the plurality of modem pool transceivers, each modem pool controller configured to provide call related processing for one or more modem pool transceivers; and one or more servers operatively coupled to the modem pool transceivers and modem pool controllers via an Internet Protocol (IP) back-bone, the one or more servers configured to provide management of the communications system.

2. The communications system of claim 1, wherein each modem pool transceiver is operated as an element in an IP network and is associated with an IP address that identifies the modem pool transceiver.

3. The communications system of claim 1, wherein the IP back-bone interconnects the plurality of modem pool transceivers with one or more data networks.

4. The communications system of claim 1, wherein each modem pool transceiver is configured to transmit to one receiving access terminal at any particular moment.

5. The communications system of claim 1, wherein the IP back-bone includes a plurality of routers coupled to the plurality of modem pool transceivers and configured to route data packets between the data networks and the modem pool transceivers.

6. The communications system of claim 5, wherein each modem pool transceiver couples to at least two routers for redundancy.

7. The communications system of claim 1, wherein the one or more modem pool controllers are centralized and couple to the plurality of modem pool transceivers via the IP back-bone.

8. The communications system of claim 1, wherein the one or more modem pool controllers are distributed about the communications system.

9. The communications system of claim 1, wherein each modem pool controller is further configured to maintain a protocol stack for each session between an access terminal and the one or more modem pool transceivers associated with the modem pool controller.

10. The communications system of claim 9, wherein the protocol stack for an inactive access terminal is stored in a memory.

11. The communications system of claim 1, wherein one to three modem pool transceivers are deployed at a cell site to provide wireless data service coverage for up to three sectors at the cell site.

12. The communications system of claim 1, wherein each modem pool transceiver is operable to hand-off a particular access terminal to another modem pool transceiver having an improved communications path.

13. The communications system of claim 1, and operable to support over-the-air activation of an access terminal.

14. The communications system of claim 13, wherein the over-the-air activation is supported using an anonymous login.

15. The communications system of claim 1, wherein the modem pool transceivers are deployable in similar manner as base station transceivers that conform to IS-95 CDMA standard.

16. The communications system of claim 1, wherein the modulated signal is a CDMA spread spectrum signal.

17. The communications system of claim 1, wherein the modulated signal has a peak data rate of at least 2.4 Mbps.

18. The communications system of claim 1, wherein the one or more servers include a RADIUS server operative to provide authentication, authorization, and accounting functions for the communications system.

19. The communications system of claim 1, wherein the one or more servers include an OAM&P server operative to provide configuration and management functions for the communications system.

20. The communications system of claim 1, wherein the one or more servers include an account server operative to store user profile information for users in the communications system.

21. The communications system of claim 1, wherein the one or more servers include a DHCP server operative to dynamically assign IP addresses for access terminals in the communications system.

22. The communications system of claim 1, and operative to provide wireless Internet services.

23. A wireless packet data communications system operative to provide wireless Internet services, comprising:

a plurality of modem pool transceivers, each modem pool transceiver configured to receive and process data packets to generate a modulated signal suitable for transmission over a terrestrial communications link, wherein the modulated signal is a CDMA spread spectrum signal and has a peak data rate of at least 2.4 Mbps, and wherein each modem pool transceiver is further operated as an element in an Internet Protocol (IP) network and is associated with an IP address that identifies the modem pool transceiver;

one or more modem pool controllers operatively coupled to the plurality of modem pool transceivers, each modem pool controller configured to provide call related processing for one or more modem pool transceivers;

a plurality of routers coupled to the plurality of modem pool transceivers and configured to route data packets between one or more data networks and the modem pool transceivers; and a local area network (LAN) operatively coupled to one or more of the routers, the LAN including a first server operative to provide authentication, authorization, and accounting functions for the communications system, and a second server operative to provide configuration and management functions for the communications system.

24. An access terminal for use in a wireless packet data communications system, comprising:

an RF module configured to receive a modulated signal over a wireless communications link and to condition the received signal to generate a conditioned signal;

a modem block coupled to the RF module and configured to demodulate the conditioned signal to generate data; and a processor core coupled to the modem block and configured to receive and process the data into packets suitable for transmission to a receiving device, and wherein the access terminal is operated as an element in an Internet Protocol (IP) network and is associated with an IP address that identifies the access terminal.

25. The access terminal of claim 24, further comprising:

an interface unit coupled to the processor core and configured to provide an Ethernet or serial interface to the receiving device.

26. The access terminal of claim 24, wherein the access terminal is assigned a unique identifier and password used to authenticate the access terminal to the communications system.

27. The access terminal of claim 24, and operative to receive data at a peak data rate of at least 2.4 Mbps.

28. A method for providing wireless packet data services in a communications system, the method comprising:

initiating a session between an access terminal and the communications system;

receiving a request for a data transmission from the communications system;

retrieving, from a data network, data indicated by the request;

processing and modulating the retrieved data to generate a modulated signal suitable for transmission over a wireless terrestrial communications link; and transmitting the modulated signal, and wherein the access terminal is operated as an element in an Internet Protocol (IP) network and is associated with an IP address that identifies the access terminal.

29. The method of claim 28, wherein the initiating includes authenticating the access terminal via a secure message exchange.

30. The method of claim 29, wherein the secure message exchange is accomplished using a Challenge Handshake Authentication Protocol (CHAP).

31. The method of claim 28, wherein the initiating includes assigning the access terminal with a static or dynamic Internet Protocol (IP) address for the session.

32. The method of claim 28, further comprising:

activating and configuring the access terminal prior to the initiating.

33. The method of claim 32, wherein the activating and configuring includes assigning a unique identifier and password to the access terminal to be used for each session.

\* \* \* \* \*